(12) United States Patent
Hasegawa et al.

(10) Patent No.: US 11,885,478 B2
(45) Date of Patent: Jan. 30, 2024

(54) LIGHTING DEVICE

(71) Applicant: Japan Display Inc., Tokyo (JP)

(72) Inventors: Makoto Hasegawa, Tokyo (JP);
Nobuyuki Suzuki, Tokyo (JP); Ken Kagabu, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/939,408

(22) Filed: Sep. 7, 2022

(65) Prior Publication Data
US 2023/0003363 A1   Jan. 5, 2023

Related U.S. Application Data

(63) Continuation of application No. 17/226,144, filed on Apr. 9, 2021, now Pat. No. 11,466,840.

(30) Foreign Application Priority Data

Apr. 15, 2020 (JP) .................................. 2020-072759

(51) Int. Cl.
F21V 14/00 (2018.01)
F21V 7/06 (2006.01)
(Continued)

(52) U.S. Cl.
CPC .......... F21V 14/003 (2013.01); F21V 7/0033 (2013.01); F21V 7/06 (2013.01);
(Continued)

(58) Field of Classification Search
CPC .... F21V 14/003; F21V 29/763; F21V 7/0033; F21V 7/06; F21V 31/04; F21V 13/04;
(Continued)

(56) References Cited

U.S. PATENT DOCUMENTS 10,001,592 B2   6/2018   Oh et al.
2005/0243237 A1*  11/2005  Sasuga ................. F21V 14/003
                                                         349/57
(Continued)

FOREIGN PATENT DOCUMENTS

CN          105911791 A      8/2016
JP          2010230887 A    10/2010
(Continued)

OTHER PUBLICATIONS

Notice of Reasons for Refusal dated Nov. 28, 2023, corresponding Japanese Application No. 2020-072759, 9 pages.

*Primary Examiner* — Bao Q Truong
(74) *Attorney, Agent, or Firm* — Maier & Maier, PLLC

(57) ABSTRACT

The purpose of the present invention is to realize a lighting device of thin, low power consumption and small light distribution angle. The present invention takes the following structure to realize the above task:
A lighting device having an emitting surface and a bottom opposing to the emitting surface including:
a resin, set between the emitting surface and the bottom, having a hole at a center,
a reflection block set in the hole at a side of the emitting surface,
an LED, which is a light source, set in the hole at a side of the bottom,
a space between the LED and the reflection block,
in which the resin is contained in a container whose inner surface is a reflecting surface.

7 Claims, 29 Drawing Sheets

(51) Int. Cl.
  *G02F 1/1337*  (2006.01)
  *G02F 1/1343*  (2006.01)
  *F21V 31/04*   (2006.01)
  *G02F 1/137*   (2006.01)
  *F21V 7/00*    (2006.01)
  *F21V 29/76*   (2015.01)
  *F21Y 115/10*  (2016.01)

(52) U.S. Cl.
  CPC ............ *F21V 29/763* (2015.01); *F21V 31/04* (2013.01); *G02F 1/137* (2013.01); *G02F 1/133738* (2021.01); *G02F 1/133742* (2021.01); *G02F 1/134309* (2013.01); *F21Y 2115/10* (2016.08); *G02F 2201/122* (2013.01)

(58) Field of Classification Search
  CPC ......... G02F 1/133742; G02F 1/133738; G02F 1/134309; G02F 1/137; G02F 2201/122; G02F 1/294; F21Y 2115/10
  See application file for complete search history.

(56) References Cited

U.S. PATENT DOCUMENTS

| | | |
|---|---|---|
| 2006/0171151 A1 | 8/2006 | Park et al. |
| 2010/0188837 A1 | 7/2010 | Van Bommel et al. |
| 2013/0176741 A1 | 7/2013 | Nakamura et al. |
| 2014/0321153 A1 | 10/2014 | Chen |
| 2016/0077402 A1 | 3/2016 | Takehara et al. |
| 2016/0291235 A1 | 10/2016 | Oh et al. |
| 2019/0025657 A1 | 1/2019 | Presniakov et al. |

FOREIGN PATENT DOCUMENTS

| | | |
|---|---|---|
| JP | 2010251785 A | 11/2010 |
| JP | 2012-069409 A | 4/2012 |
| JP | 2013140318 A | 7/2013 |
| JP | 2016057541 A | 4/2016 |
| JP | 2019-169435 A | 10/2019 |

\* cited by examiner

C-C

D-D

E-E

V1 > V2 > V3 > V4

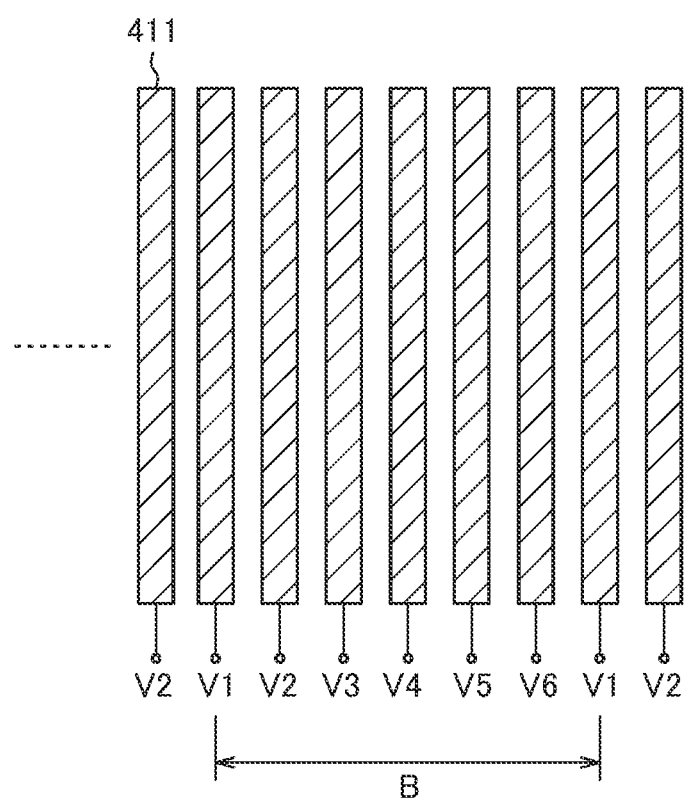

K-K

V5 > V4 > V3 > V2 > V1

K-K

LIGHTING DEVICE

CLAIM OF PRIORITY

The present application is a continuation of U.S. application Ser. No. 17/226,144, filed Apr. 9, 2021, which claims priority from Japanese Patent Application JP 2020-072759 filed on Apr. 15, 2020, the content of each of which is hereby incorporated by reference into this application.

BACKGROUND OF THE INVENTION

(1) Field of the Invention

The present invention relates to the lighting device of thin, small light distribution angle, and less power consumption.

(2) Description of the Related Art

Light emitting diodes (LEDs) are being used for the lighting device. Light emitting diodes have high luminous efficiency, and thus profitable for low power consumption. However, since the light emitting diode is a point light source, it must be transformed to the surface light source if it is used as a lighting device. Besides, if it is used as a spot light, a light distribution angle characteristics must be considered.

Patent document 1 discloses a lighting device, which uses a light emitting diode as the light source and to put a collimator lens surrounding the light emitting diode to collimate the emitting light. Patent document 1 further discloses to dispose a liquid crystal lens at the light emitting side of the lighting device to control a transmittance, a diffusion, and a deflection of the emitting light.

Patent document 2 discloses a lighting device, which uses a light emitting diode as the light source and to put a condenser lens surrounding the light emitting diode; and further to put an optical device at the emitting side of the lighting device to change the direction of the emitting light. Patent document 2 further discloses to use a liquid crystal lens as an optical device to change the direction of the emitting light.

Patent document 3 discloses to use a liquid crystal lens to control the shape of the light beam.

PRIOR TECHNICAL DOCUMENT

Patent Document

Patent document 1: Japanese patent application laid open No. 2019-169435
Patent document 2: Japanese patent application laid open No. 2012-69409
Patent document 3: US 2019/0025657 A1

SUMMARY OF THE INVENTION

The lighting device needs to have a small light distribution angle when it is used as e.g. a spot light. Conventionally, for such a lighting device, a parabolic mirror has been used to form a parallel light. However, a certain depth is necessary in such a lighting device; therefore, it is difficult to attain a small lighting device or thin lighting device. In the meantime, the lighting devices, disclosed in Patent document 1 and patent document 2, need a lens to collimate the light from the light source; therefore, they need a certain length of optical path, consequently, it is difficult to realize a lighting device of small depth.

In addition, since a light emitting efficiency of the LED decreases when the LED becomes high temperature, it is preferable to be a low heat generating light source, namely, low power consuming light source as a whole. Besides, if heat generation from the light source is less, it becomes not necessary to provide a heat sink and so forth.

The purpose of the present invention is to realize a lighting device of thin, comparatively less power consumption, and small light distribution angle.

The present invention solves the above explained problems; concrete structures are as follows.

(1) A lighting device having an emitting surface and a bottom opposing to the emitting surface including:
a resin, set between the emitting surface and the bottom, having a hole at a center,
a reflection block set in the hole at a side of the emitting surface,
an LED, which is a light source, set in the hole at a side of the bottom,
a space between the LED and the reflection block,
in which the resin is contained in a container whose inner surface is a reflecting surface.

(2) The lighting device according to (1)
in which a plan view of an outer surface of the resin is circular, and a cross sectional view of an outer surface of the resin is a curved line.

(3) The lighting device according to (1),
in which a plan view of an outer surface of the resin is circular, and a cross sectional view of an outer surface of the resin is a curved line.

(4) The lighting device according to (1),
in which a plan view of an inner surface of the container, which contains the resin, is circular, and a cross sectional view of an outer surface of the container, which contains the resin, is a curved line.

(5) The lighting device according to (1),
in which a thickness of the container, which contains the resin, is thicker at the bottom side than at the emitting surface side in a cross sectional view.

(6) The lighting device according to (1),
in which a surface of the reflection block opposing to the LED is a curved surface.

(7) The lighting device according to (1),
in which a first liquid crystal lens having a circular outer shape is disposed on the emitting surface,
the first liquid crystal lens has plural lenses extending in a first direction and arranged in a second direction.

(8) The lighting device according to (7),
in which a second liquid crystal lens having a circular outer shape is disposed on the first liquid crystal lens,
the second liquid crystal lens has plural lenses extending in a second direction and arranged in a first direction.

(9) The lighting device according to (8),
in which an initial alignment of the liquid crystal molecules in the first liquid crystal lens and the second liquid crystal lens is homogeneous.

(10) The lighting device according to (1),
in which a liquid crystal lens having a circular outer shape is disposed on the emitting surface,
the liquid crystal lens has concentric plural lenses,
the initial alignment of the liquid crystal molecules is homeotropic.

(11) The lighting device according to (1),
in which a liquid crystal lens having a circular outer shape is disposed on the emitting surface, the liquid crystal lens has a liquid crystal layer between a first substrate and a second substrate, plural first electrodes formed in concentric are formed on the first substrate, a disc shaped second electrode is formed in plane on the second substrate, lens action of the liquid crystal lens is formed by applying different voltages to each of the plural first electrodes, an intimal alignment of liquid crystal molecules in the liquid crystal layer is homeotropic.

(12) The lighting device according to (11), in which, a refractive index in the liquid crystal lens in the liquid crystal layer is minimum at a periphery of the liquid crystal lens, a refractive index in the liquid crystal lens in the liquid crystal layer is maximum at a center of the liquid crystal lens.

BRIEF DESCRIPTION OF THE DRAWINGS

FIG. 28 is a plan view which shows an example of voltages applied to the first electrodes for lens action of FIG. 27;

DETAILED DESCRIPTION OF THE PREFERRED EMBODIMENTS

Figure 1:
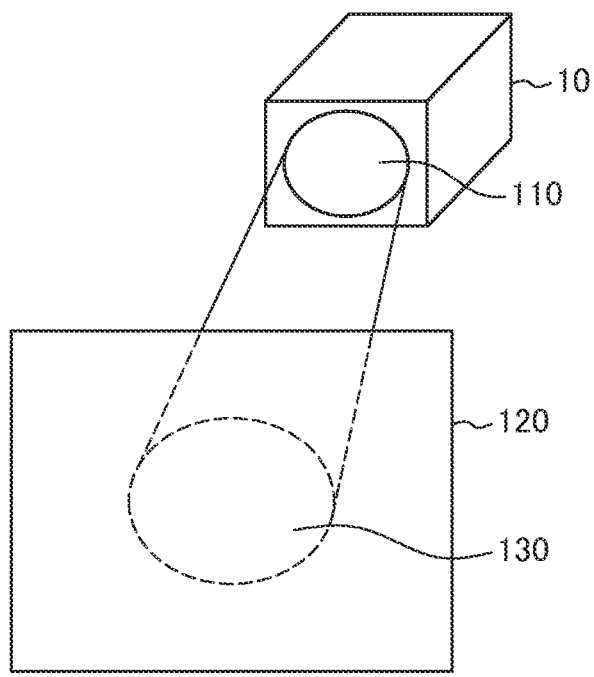
FIG. 1 is a perspective view of the lighting device.

FIG. 1 is an example of the lighting device 10, which is used for a spot light. The light from the lighting device 10 is collimated; a spot light 130 is emitted from the emitting surface 110, and irradiates the incident surface 120. The light distribution angle is controlled as e.g. 12 degrees to acquire a spot light 130.

Figure 2:
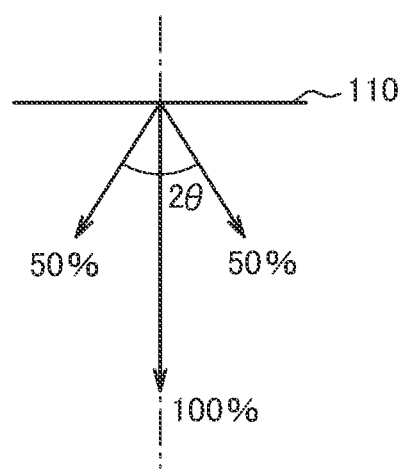
FIG. 2 is a definition of the light distribution angle.

FIG. 2 defines the light distribution angle. FIG. 2 shows e.g. that the floor is irradiated with a spot light emitted from a light emitting surface 110 disposed on the ceiling. The light intensity is largest at the normal direction to the light emitting surface 110; the light intensity decreases according to the polar angle becomes larger. The light distribution angle is defined as 2θ provided the intensity along the normal direction is 100%, and the intensity along the polar angle θ is 50%. In general collimated light, the light distribution angle is required as 12 degrees or less.

Figure 3:
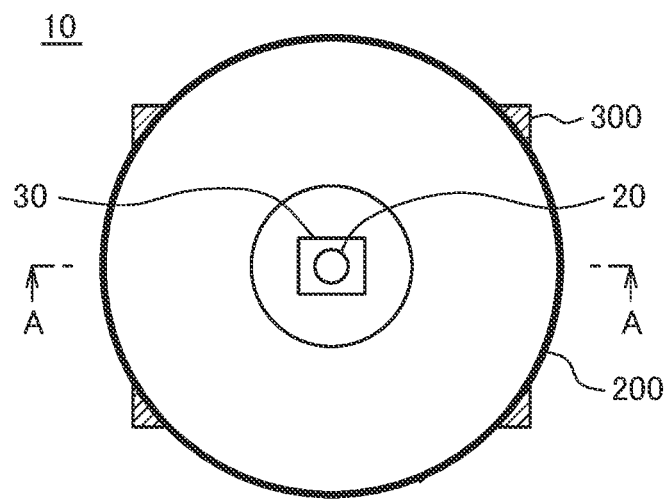
FIG. 3 is a plan view of the lighting device, which collimates light with parabolic mirror.
Figure 4:
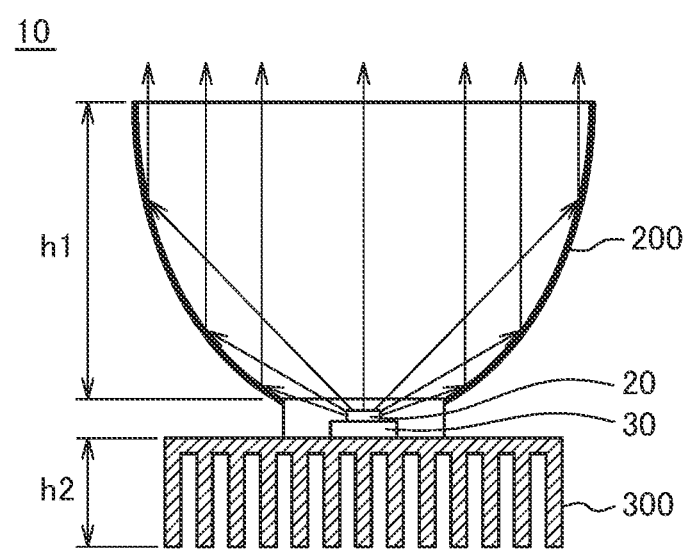
FIG. 4 is a cross sectional view of FIG. 3 along the line A-A.

Conventionally, a parabolic mirror 200 has been used to acquire such a collimated light. FIG. 3 is a plan view of the lighting device 10 using the parabolic mirror 200; FIG. 4 is a cross sectional view of the lighting device 10 of FIG. 3. In FIG. 3, the LED 20 is set at the center of the parabolic mirror 200. The LED 20 is set e.g. on the LED circuit substrate 30. The LED 20 is a high brightness LED, which becomes high temperature; thus, the LED 20 is set on the heat sink 300. A part of the heat sink 300, which is set at the rear of the parabolic mirror 200, is visible in FIG. 3.

FIG. 4 is a cross sectional view of FIG. 3 along the line A-A. In FIG. 4, the LED 20 is disposed at the bottom surface of the parabolic mirror 200. The lights emitted from the LED 20, except the light emitted in the optical axis direction, reflect at the parabolic mirror 200 and become parallel to the optical axis. The parabolic mirror 200, however, needs to be as high as h1 for enough collimating function. The height h1 of the parabolic mirror 220 needs to be approximately 60 mm to acquire the light distribution angle of approximately 12 degrees. Actually, since the height h2, e.g. approximately 20 mm, of the heat sink 300 is added, the total height of the lighting device becomes 80 mm or more. In the meantime, in the lighting device of FIGS. 3 and 4, one LED, which constitutes the light source, needs to be supplied with a large power; consequently, the heat generation in the LED becomes large, thus, the heat sink is indispensable.

Figure 5:
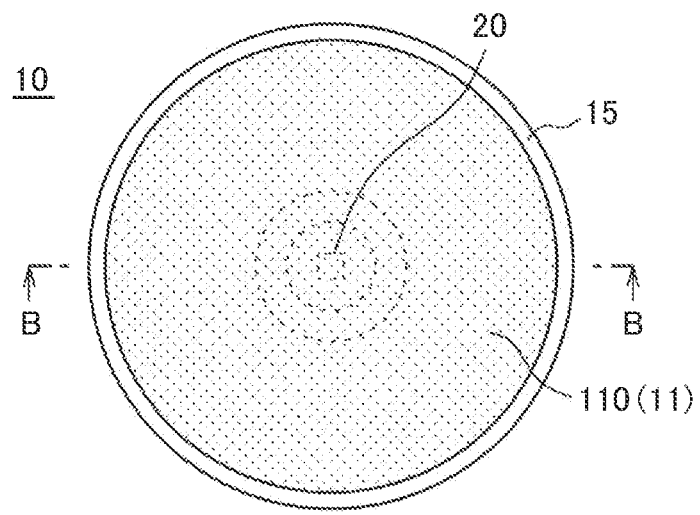
FIG. 5 is a plan view of considered first structure.
Figure 6:
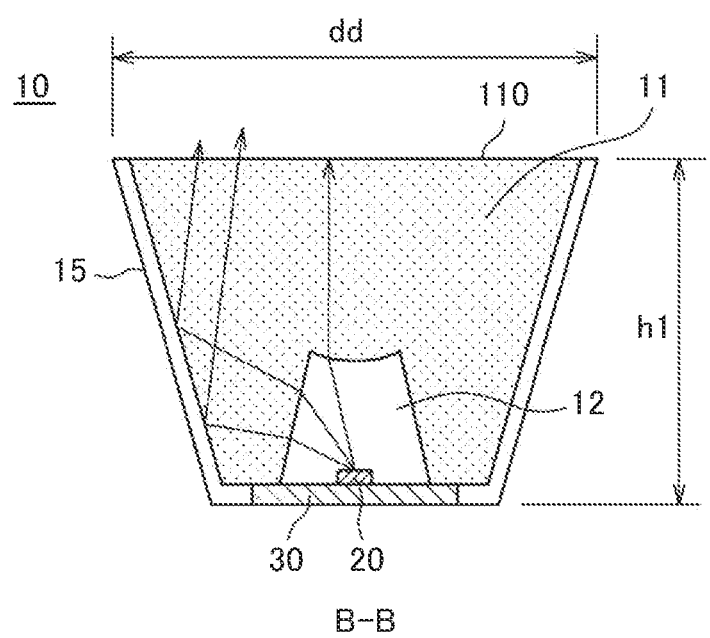
FIG. 6 is a cross sectional view of FIG. 5 along the line B-B.

The inventors considered the structures of FIGS. 5 through 10 to countermeasure the problem explained above in relating to FIGS. 3 and 4. FIGS. 5 and 6 are the structures to acquire a collimated light by forming a lens structure between the LED light source and the emitting surface of the lighting device. FIG. 5 is a plan view; FIG. 6 is a cross sectional view of FIG. 5 along the line B-B. In FIG. 5, the resin 11, which reveals lens effect, is filled in the container 15 whose inner side is mirror. As shown in FIG. 6, a space 12 is formed in the resin 11; the LED 20, which is light source, is set at the bottom of the space 12. The light from the LED 20 refracts between the space 12 and the resin 11; reflects at the inner wall of the container 15, and eventually goes out from the emitting surface 110 of the lighting device.

The light distribution angle can be made as small as e.g. 5 degrees in such a structure, however, since that structure utilizes refraction effect of the lens, a certain length of light path is necessary; therefore, a height h1 of the lighting device 10 becomes as high as approximately 60 mm. Therefore, from the view point of a height h1 of the lighting device 10, the structure of FIG. 6 does not give enough improvement. In the meantime, a diameter dd of the emitting surface 110 of the light emitting device 10 is e.g. 89 mm.

Figure 7:
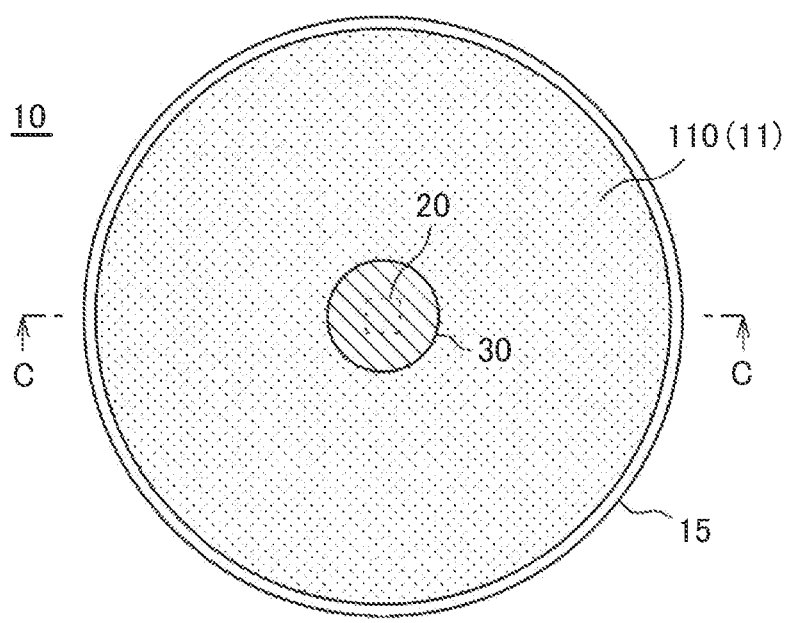
FIG. 7 is a plan view of considered second structure.
Figure 8:
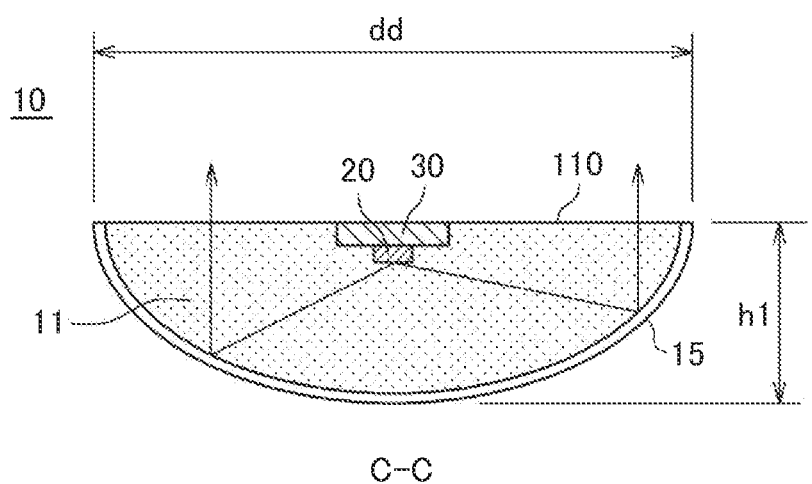
FIG. 8 is a cross sectional view of FIG. 7 along the line C-C.

FIG. 7 is a plan view of the lighting device 10 which a height h1 can be low. FIG. 8 is a cross sectional view of FIG. 7 along the line C-C. As shown in FIGS. 7 and 8, the LED 20 as a light source and the LED circuit substrate 30 are set at the side of the light emitting surface 110 in the light emitting device 10, and the lights are reflected at the inner wall, which is constituted as a mirror, of the container 15, thus, collimated lights are emitted.

The structure shown in FIGS. 7 and 8 can make the height h1 of the lighting device 10 low; however, the diameter dd of at the light emitting surface 110 of the lighting device 10 tends to be bigger as e.g. 110 mm. Further, this structure has difficulty in forming enough collimated light, thus, the light distribution angle becomes as approximately 13 degrees.

Figure 9:
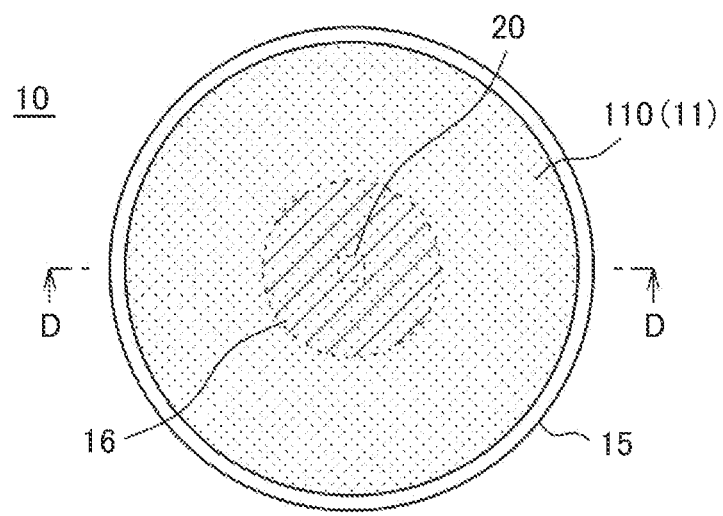
FIG. 9 is a plan view of considered third structure.
Figure 10:
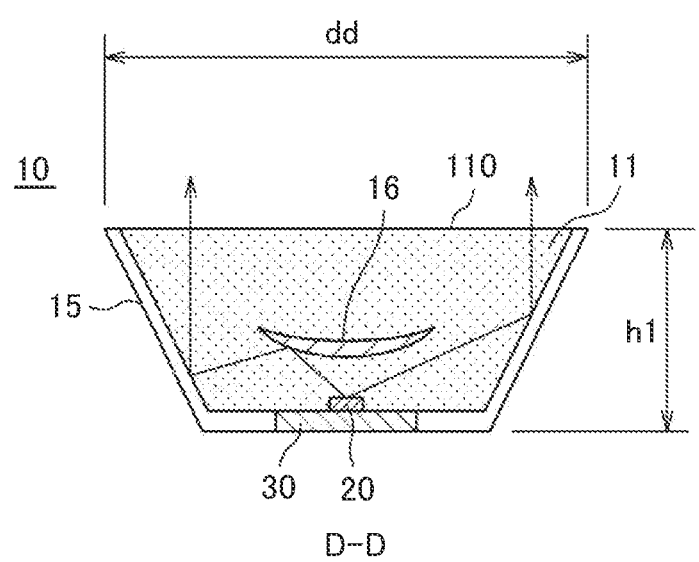
FIG. 10 is a cross sectional view of FIG. 9 along the line D-D.

The structure of FIGS. 9 and 10 is a third structure of the lighting device 10 considered by the inventors; FIG. 9 is a plan view and FIG. 10 is a cross sectional view of FIG. 9 along the line D-D. As shown in FIGS. 9 and 10, the resin 11 is filled in the container 15; the LED 20 as the light source is set at the bottom of the container 15. As shown in FIG. 10, the curved surface reflector 16 made of metal is set opposing to the LED 20, and is embedded in the resin 11.

As shown by arrows, the lights emitted from the LED 20 reflect at the curved surface reflector 16 and go to the inner wall, which is made as reflecting surface, of the container 15; then, the lights are reflected at the inner wall of the container 15 and go out from the emitting surface 110. In this structure, it is rather easy to acquire a necessary light path because lights are returned to the direction of the light source 20 by the curved surface mirror 16. Therefore, a collimated light can be acquired without making a height of the lighting device 10 too high; in this case, a height h1 of the lighting device 10 can be as low as 35 mm. In addition, a diameter dd of the lighting device 10 can be made small as 75 mm. The light distribution angle of this structure can be made as approximately 10 degrees.

Embodiment 1

Figure 11:
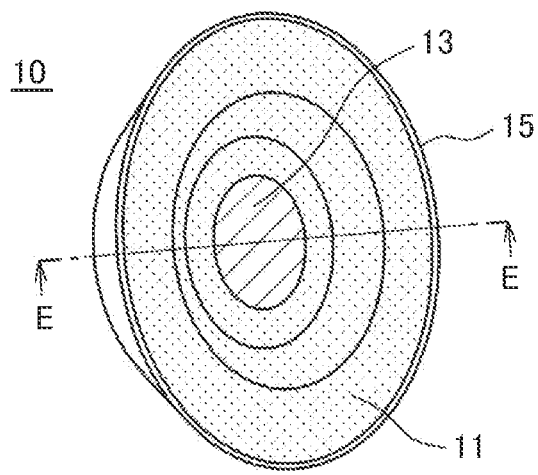
FIG. 11 is a perspective view of the lighting device according to embodiment 1.
Figure 12:
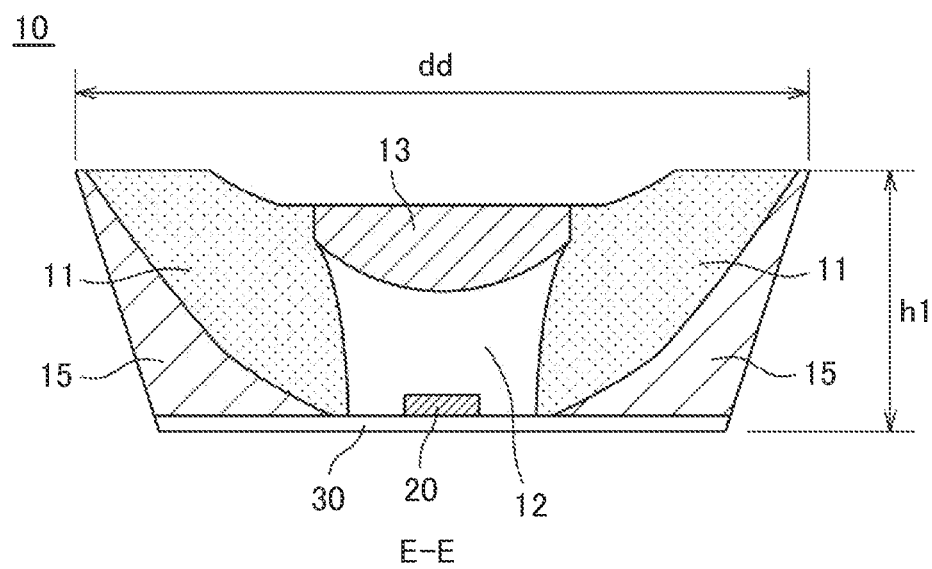
FIG. 12 is a cross sectional view of FIG. 11 along the line E-E.
Figure 13:
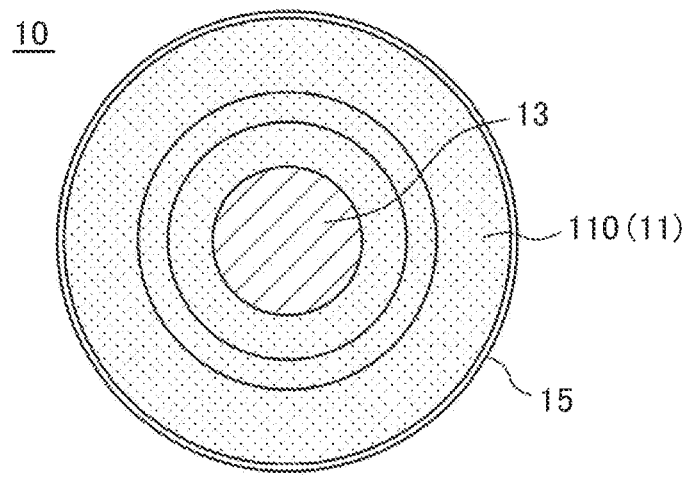
FIG. 13 is a plan view of the lighting device according to embodiment 1.

FIGS. 11 through 13 are the lighting device 10 according to embodiment 1, which is based on the above structures explained with FIGS. 5 through 10 considered by the inventors. FIG. 11 is a perspective view of the structure of embodiment 1. In FIG. 11, the emitting surface is flat and is formed by resin 11, which has a lens effect. The emitting surface is circular in a plan view. The upper most portion of the container 15 is visible at the periphery of the emitting surface. The resin 11 forms two surfaces at the emitting surface area, namely, a first surface, which constitutes the periphery of the emitting surface and a second surface which constitutes recessed central area. The first surface and the second surface are connected to each other by inclined third surface. The purpose of forming the recessed region is to control the light distribution angle of the emitting light. The reflection block 13 made of metal is locked in the central area of the recessed portion of the resin 11. The reflection block 13 is circular in a plan view.

FIG. 12 is a cross sectional view of FIG. 11 along the line E-E. In FIG. 12, the LED 20 is disposed at the bottom of the lighting device 10; the reflection block 13 is disposed opposing to the LED 20. The reflection block 13 is made of high reflection metal as e.g. aluminum. The reflection block 13 can be formed by resin whose surface, opposing to the LED 20, is coated by metal film having high reflectance.

The surface, opposing to the light source 20, of the reflection block 13 is a curved surface; the opposite surface, namely emitting surface side, of the reflection block is flat. Forming the curved surface is easy if it is a spherical surface. However, theoretically, the curved surface of the reflection block 13 is determined in relation with the inner curved surface of the hole formed in the resin 11 and the curved reflection surface that corresponds to the outer surface of the resin 11.

Unlike the container of FIGS. 6, 8 and 10, the bottom portion of the container 15 of FIG. 12 is made thick so that the curved surface can be designed and manufactured with flexibility, thus, to make the efficiency of the reflection surface maximum, or to make minimize the light distribution angle. A hole is formed at the bottom of the container 15; the hole is filled with the LED 20 and the LED circuit substrate 30.

There is a space 12, where the resin 11 does not exist, between the LED 20 and the refection block 13. In the meantime, the space 12 is a hole formed in the resin 11. The hole is circular in a plan view. This space 12 is surrounded by lower curved surface of the reflection block 13 and the inner wall of the resin 11. The inner wall of the resin 11 is circular in a plan view and is curved line in a cross sectional view. The light emitted from the LED 20 reflects at the lower curved surface (herein after, simply, curved surface) of the reflection block 13, and impinges in the inner wall of the hole of the resin 11. The light, impinged in the inner wall, refracts in the direction determined by curved surface of the inner wall, impinging angle to the inner wall, and refraction index of the resin 11.

The outer surface of the resin 11 is circular in a plan view and is a curved line in a cross sectional view. The inner surface of the container 15 is formed along the outer surface of the resin 11. The light entered the resin 11 is reflected at the inner surface of the container 15 and goes to the upper surface of the resin 11, which is an emitting surface. The inner surface of the container 15 is a reflecting surface to collimate the impinged light. Namely, the reflection surface of the container 15 is designed most suitably in relation with the curved surface of the reflection block 13 and the curved surface of the hole of the resin 11. The thickness of the container 15 is thicker at the bottom than at the emitting surface in a cross sectional view to facilitate for designing a suitable curved inner surface. Such a container, can be made of metal as e.g. aluminum, can be formed by die-cast.

The light reflected at the inner surface of the container 15 is further refracted at the emitting surface and goes to outside. The lighting device is designed so that the exiting light has a certain light distribution angle. In embodiment 1, the recessed portion and the inclined portion are formed at the emitting surface to control the light distribution angle finally. A diameter, a depth of the recess and an angle of the inclined portion to form the recess can be determined freely. The reflection block 13 is locked at the center of the recess.

In the meantime, the LED 20 becomes high temperature, thus, a heat from the LED 20 must be dissipated. In FIGS. 3 and 4, the heat sink 300 having fins is disposed to dissipate the heat. In embodiment 1, there is a relatively thick metal container 15 near the LED 20, thus, the container 15 can be used as a heat sink.

Such a lighting device can be formed as following order. At the outset, the container 15 is made of aluminum and is formed with die-cast; the resin 11 is formed in the container 15 with injection molding. A hole, which is circular in a plan view and is curved line in a cross sectional view, is formed at the center of the resin 11. Then, the reflection block 13, which is made of aluminum block, is locked in the hole formed at the center of the resin 11. On the other hand, a hole is formed at the bottom of the container 15, which is filled by the LED 20 and LED circuit substrate 30. As a result, certain distance is made between the light source of the LED 20 and the reflection block 13.

The lighting device of e.g. a thickness h1 is 30 mm, a diameter dd of the emitting surface is 90 mm and the light distribution angle of approximately 10 degrees can be realized according to the structure explained by FIGS. 11 and 12.

FIG. 13 is a plan view of embodiment 1. Most of the area of the emitting surface 110 is occupied with the resin 11; however, the reflection block 13 is locked in the recess of the emitting surface 110. Namely, a light is not emitted from the center of the emitting surface 110, therefore, non-uniformity in illuminance distribution occurs at the emitting surface 110.

Figure 14:
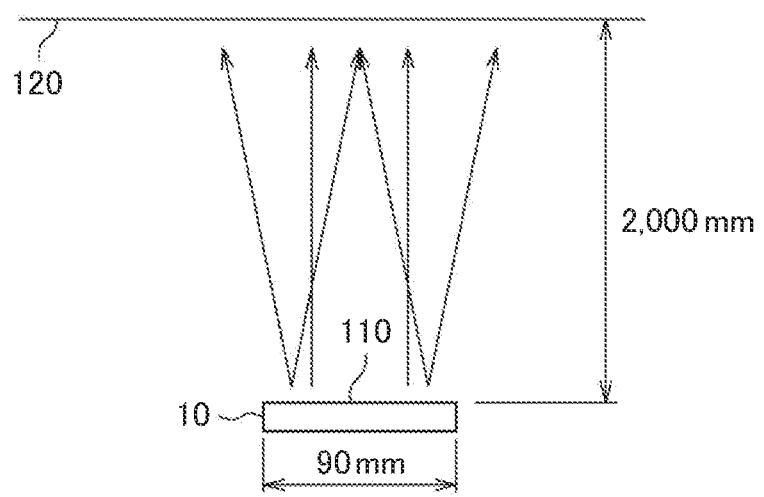
FIG. 14 is a measuring system of illuminance distribution.
Figure 15:
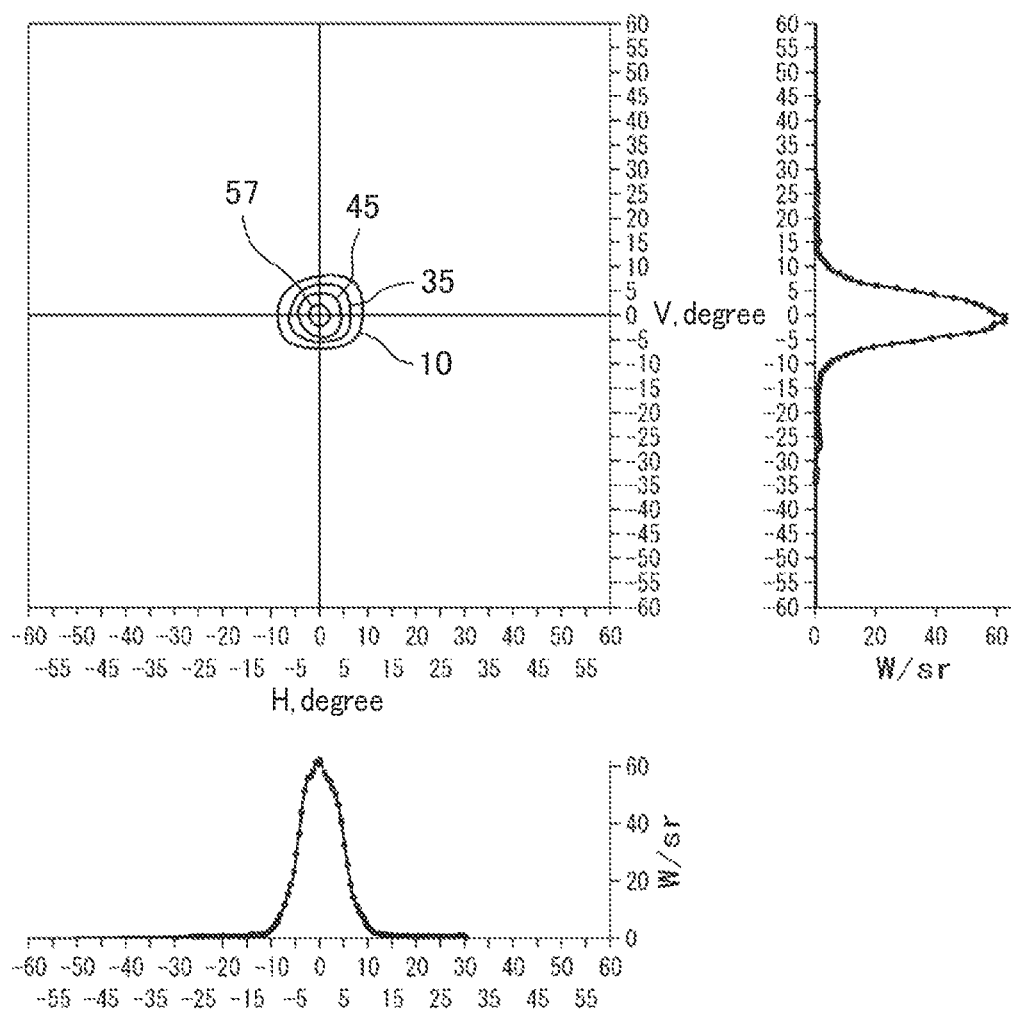
FIG. 15 is graphs of a result of illuminance distribution.

However, the influence of the reflection block to the non-uniformity in illuminant distribution actually does not occur at the irradiated surface. For example, the illuminance distribution at the irradiated surface 120, which is 2000 mm distant from emitting surface 110 of the lighting device 10 as depicted in FIG. 14, is shown FIG. 15. The central graph of FIG. 15, which has contours, shows contours of illumination intensities; the unit is W (Watt)/Steradian. In this graph, the horizontal axis is a polar angle (degree) in the horizontal direction and the vertical axis is a polar angle (degree) in the vertical direction. The graph in the bottom of FIG. 15 is a graph which shows an illumination distribution in the horizontal direction, in which the horizontal axis is polar angle (degree) and the vertical axis is intensity of illuminance (W (Watt)/Steradian). The graph in the right hand side of FIG. 15 is a graph which shows a illuminance distribution in the vertical direction, in which the vertical axis is polar angle (degree) and the horizontal axis is intensity of illuminance (W (Watt)/Steradian). As shown in FIG. 15, the reflection block 13 disposed at the center of the emitting surface 110 actually does not have influence to the illuminance distribution at the irradiation surface 120.

In the structure of embodiment 1, light loss can be made low if e.g. the resin 11 of high light transmittance like acrylic resin is used, and the reflection block 13 and reflection container 15 of high reflectivity are used. Therefore, the lighting device having a compact outer dimension, high light utilization efficiency and low light distribution angle can be realized.

In the above specification, it is explained that the plan views of the emitting surface of resin 11, the hole at the center of the resin 11 and the reflection block 13 are circular; however, this circular shape is not necessarily be a precise circle, but, e.g. the circular shape can be substituted by an ellipsis. In the case of the ellipsis, however, if a difference in the diameter of the major axis and the diameter of the minor axis is large, the light distribution angle in the major axis and the light distribution angle in the minor axis become different.

As described above, according to embodiment 1, a lighting device of short depth, small light distribution angle, and high light utilization efficiency can be realized.

Embodiment 2

Figure 16A:
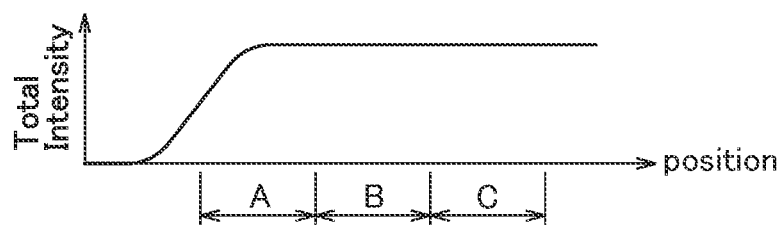
FIG. 16A is an example of illuminance distribution when the liquid crystal lens according to embodiments 2 and 3 are used.
Figure 16B:
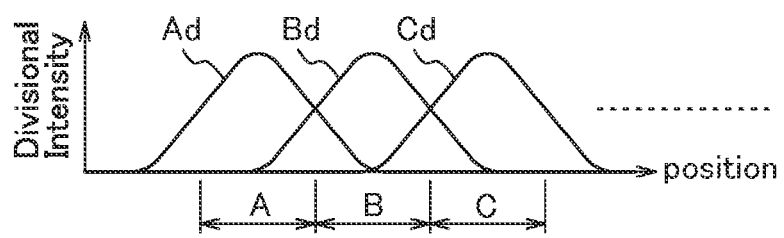
FIG. 16B is an example of illuminance distribution at the irradiated surface corresponding to each of the emitting region when a liquid crystal lens is set on each of the divided emitting region.
Figure 16C:
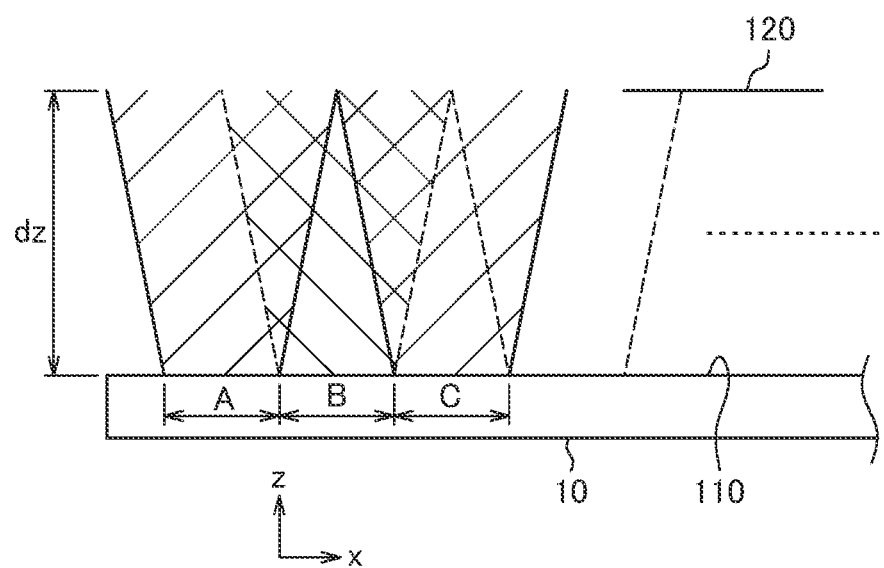
FIG. 16C is a cross sectional view in which the emitting surface is divided into regions to explain the lens action of the liquid crystal lens according to embodiments 2 and 3.

Embodiment 2 relates to the structure to control the outgoing light by setting liquid crystal lens at the emitting surface of the lighting device. FIGS. 16A through 16C are conceptual view relating to a function of the liquid crystal lens. FIG. 16C is a cross sectional view of the lighting device 10. In FIG. 16C, the emitting surface is divided into the regions of A, B, C and so forth. The light having a predetermined light distribution angle is emitted from each of the regions.

FIG. 16B shows an example of illuminance at a distance dz from the emitting surface 110 in FIG. 16C. The vertical axis in FIG. 16B is an illuminance from each of areas A, B, C, and the like; Ad, Bd, Cd, and so forth are distribution of illuminance, which resembles to a normal distribution. FIG. 16A is a summation of illuminance from each of the areas depicted in FIG. 16B. The vertical axis in FIG. 16A is a summation of illuminance at the irradiation surface 12 from each of the areas at the emitting surface area 110. FIG. 16A shows the total illuminance distribution at the irradiated surface 120, a distance dz away from the emitting surface 110, is trapezoidal.

Embodiment 2 is a structure to set a liquid crystal lens at the emitting surface 110 to control the illuminance distribution at the irradiated surface 120, namely, to change the illuminance distribution Ad, Bd, Cd, and so forth at the irradiated plane 120, a distance dz away from the emitting surface 110, by changing emitting light distribution at the regions A, B, C and so forth at the emitting surface 110.

Figure 17:
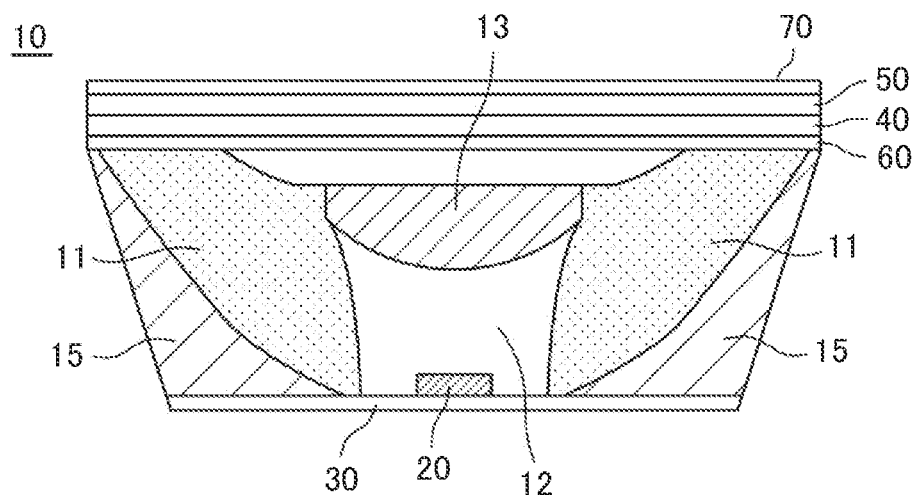
FIG. 17 is a cross sectional view of the lighting device according to embodiment 2.

FIG. 17, is a cross sectional view of lighting device 10 of embodiment 2. The plan view of FIG. 17 is omitted because it is the same as FIG. 13 except that the upper most component of the lighting device 10 is the upper polarizing plate 70 in embodiment 2. In FIG. 17, the structures from the LED 20 through upper surface of the resin are the same as FIG. 12, therefore, explanation of those portions are omitted. In FIG. 17, the lower polarizing plate 60 for the liquid crystal lens is set on the resin 11, the lower liquid crystal lens 40 is set on the lower polarizing plate 60, the upper liquid crystal lens 50 is set on it, and the upper polarizing plate 70 is set on the upper liquid crystal lens 50.

Figure 18:
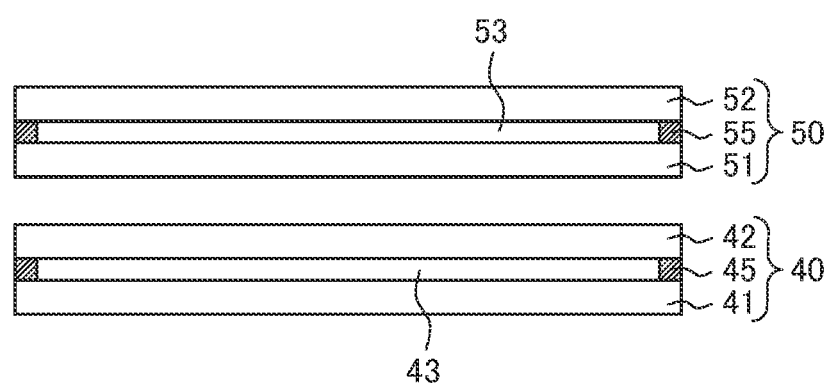
FIG. 18 is a cross sectional view of the first liquid crystal lens and the second liquid crystal lens.

FIG. 18 is a cross sectional view of the lower liquid crystal lens 40 and the upper liquid crystal lens 50. In the lower liquid crystal lens 40, the first substrate 41 and the second substrate 42 are adhered to each other at the periphery thereof through the seal material 45; the liquid crystal 43 is sealed thereinside. In the upper liquid crystal lens 50, the third substrate 51 and the fourth substrate 52 are adhered to each other at the periphery thereof through the seal material 55; the liquid crystal 53 is sealed thereinside.

Figure 19:
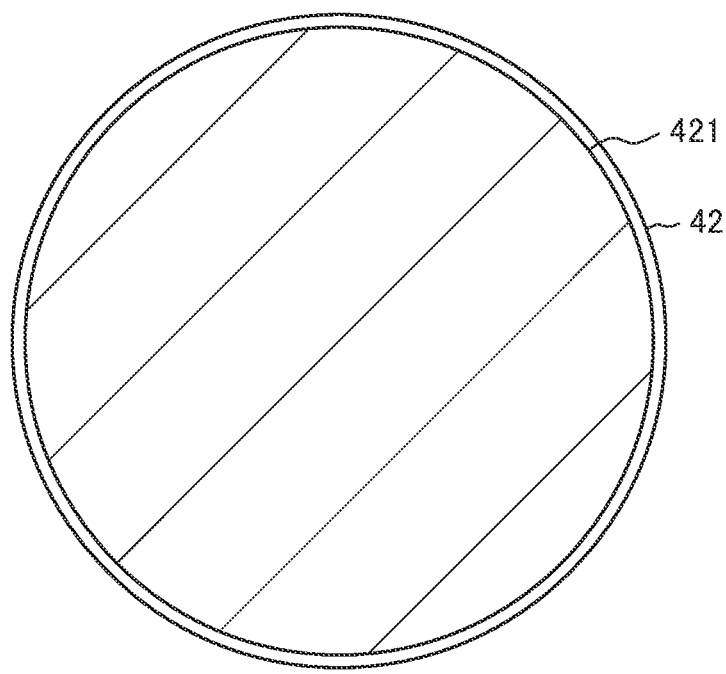
FIG. 19 is a plan view of the second substrate of the first liquid crystal lens.
Figure 20:
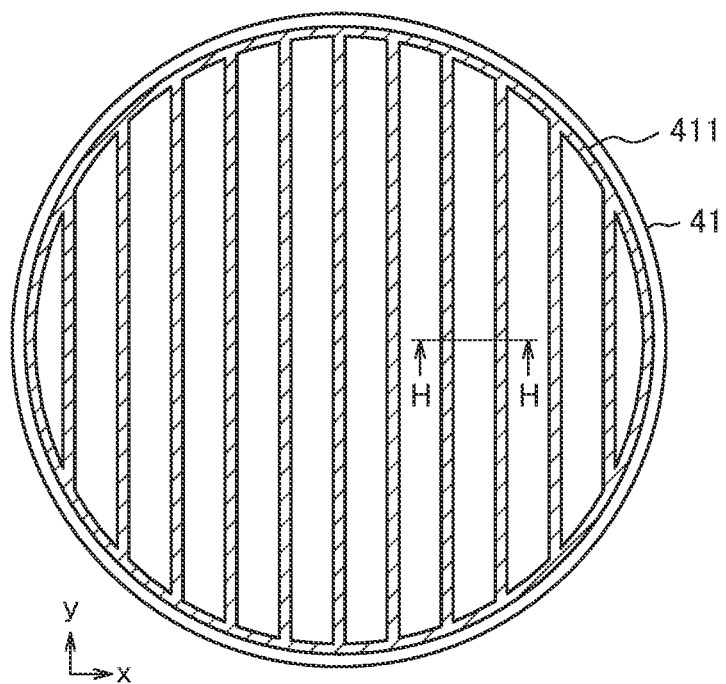
FIG. 20 is a plan view of the first substrate of the first liquid crystal lens.

FIG. 19 is a plan view of the second electrode 421 formed on the second substrate 42 of the lower liquid crystal lens 40. FIG. 20 is a plan view of the first electrode 411 formed on the first substrate 41 of the lower liquid crystal lens 40. In FIG. 20, the first electrodes 411 extend in y direction and are arranged in x direction.

Figure 21:
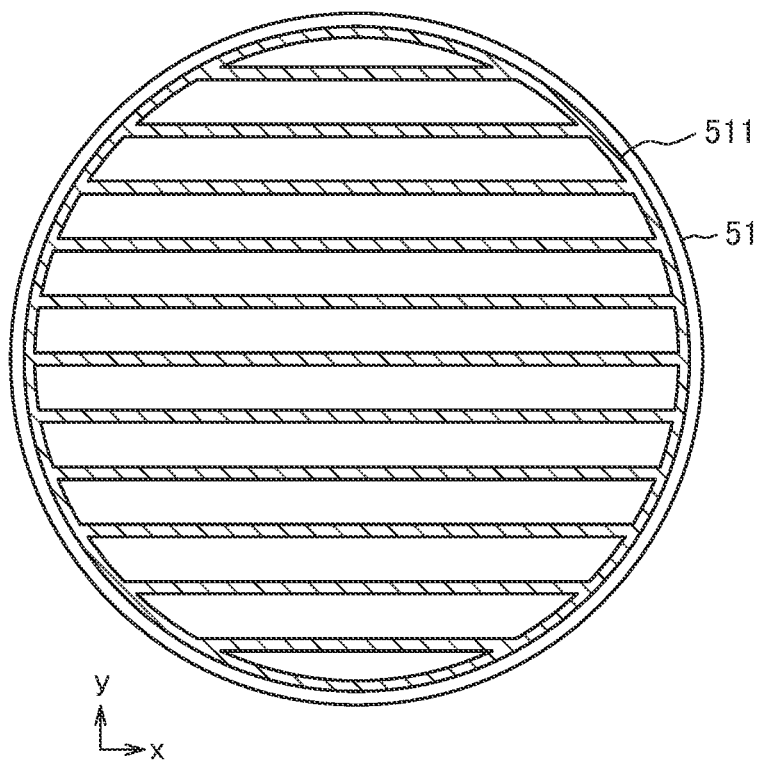
FIG. 21 is a plan view of the third substrate of the second liquid crystal lens.

FIG. 21 is a plan view of the third electrode 511 formed on the third substrate 51 of the upper liquid crystal lens 50. The third electrodes 511 extend in x direction and are arranged in y direction. The fourth electrode formed on the fourth substrate 52 of the upper liquid crystal lens 50 is the same as the second electrode 421 of the lower liquid crystal lens 40 shown in FIG. 18. All the electrodes from the first electrode through the fourth electrode formed on the liquid crystal lenses 40 and 50 are made of transparent conductive film as e.g. ITO (Indium Tin Oxide).

Figure 22A:
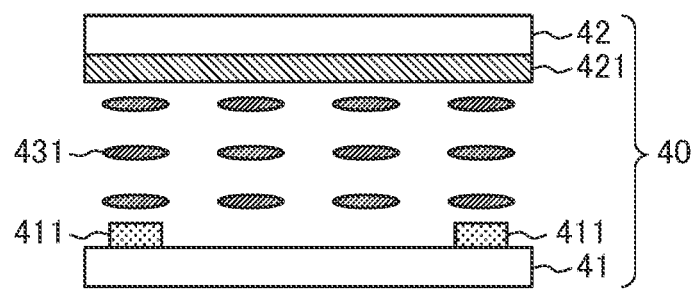
FIG. 22A is a cross sectional view in which lens action of the liquid crystal lens is shown.
Figure 22B:
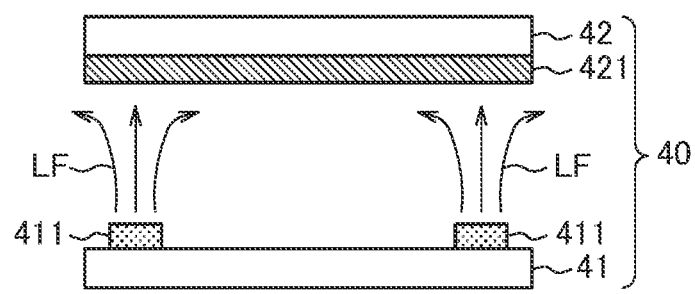
FIG. 22B is another cross sectional view in which lens action of the liquid crystal lens is shown.
Figure 22C:
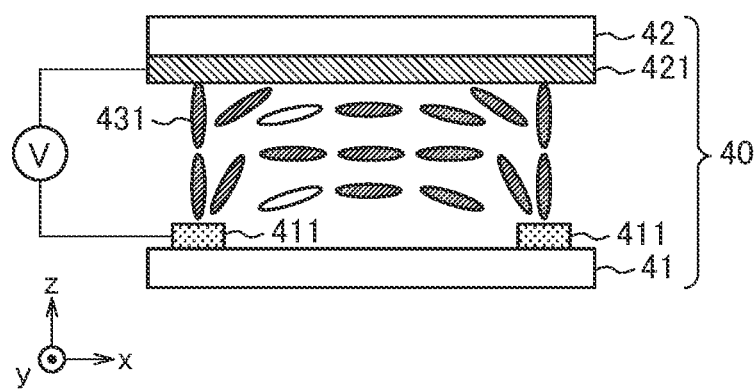
FIG. 22C is yet another cross sectional view in which lens action of the liquid crystal lens is shown.

FIGS. 22A through 22C are cross sectional views to explain function of the liquid crystal lens, which corresponds to e.g. cross sectional view along the line H-H of FIG. 20. FIG. 22A through FIG. 22C are explained for the lower liquid crystal lens 40; however, the function is the same for the upper liquid crystal lens 50. In FIG. 22A, the comb shaped electrode 411 is formed on the first substrate 41 and the plane electrode 421 is formed on the second substrate 42. The liquid crystal molecules 431 are arranged parallel to the substrate if field is not applied between the electrodes.

FIG. 22B is an example of electric lines of forces LF when a voltage is applied between the comb shaped electrode 411 of the first substrate 41 and the plane electrode 421 of the second substrate 42. FIG. 22C is a cross sectional view which shows alignment of the liquid crystal molecules 431 when a voltage is applied to the first electrode 411. In FIG. 22C, the liquid crystal molecules 431 align along the lines of forces LF; consequently, the distribution in refraction is generated, thus, liquid crystal lens is formed. Such a lens is called as the distributed refractive index type lens GRIN (Gradient Index Lens).

Figure 23:
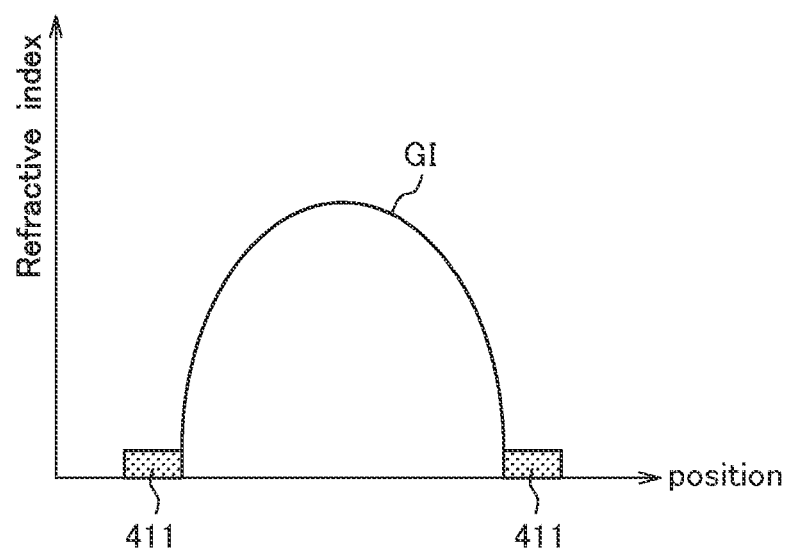
FIG. 23 is a graph that shows a lens action of the liquid crystal lens.

FIG. 23 is an example of the distributed refractive index type lens. The vertical axis of FIG. 23 is refractive index. The refractive index is minimum on the first electrode 411, which is a comb electrode; the refractive index is maximum at the intermediate position between the comb electrodes 411. FIG. 23 shows a normal quadratic curve; however, the distribution of the refractive index can be drastically changed by a voltage between the first electrode 411 and the second electrode 412, a distance between the comb electrodes of the first electrode 411, a thickness of the liquid crystal layer 43, and so forth. Such function is the same in the upper liquid crystal lens 50. However, the directions of the lens action are perpendicular between in the lower liquid crystal lens 40 and in the upper liquid crystal lens 50.

Figure 24:
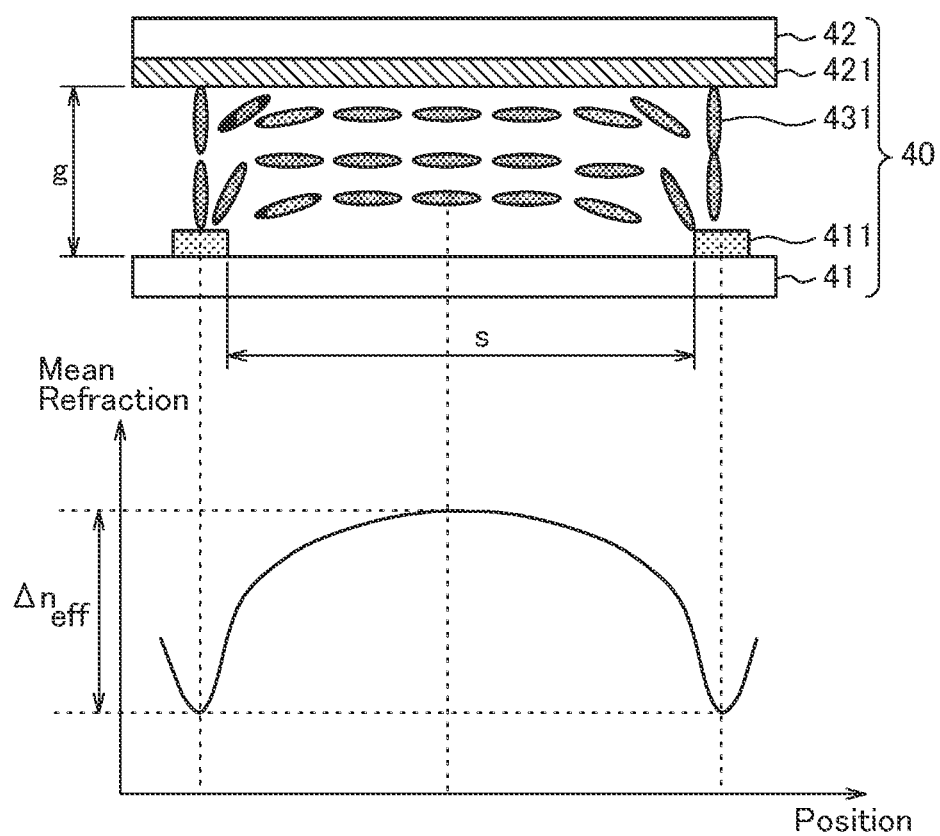
FIG. 24 is a cross sectional view of another shape of the liquid crystal lens.

A lens pitch of the liquid crystal lens is often determined by division number in the emitting surface. On the other hand, a range in thickness g of the liquid crystal layer in the liquid crystal lens is often limited. FIG. 24 is alignments of the liquid crystal molecules 431 and a distribution of the refractive index when the space s between the comb electrodes 411 is substantially larger than a thickness g of the liquid crustal layer. In FIG. 24, the vertical axis is a mean refractive index at each of the positions in the liquid crystal lens; Δneff is a difference of the refractive index in the liquid crystal lens. In the lens in FIG. 24, a lens of small radius of curvature is formed near the comb electrode 411, and a lens of large radius of curvature is formed at the intermediate position between the comb electrodes 411.

Figure 25:
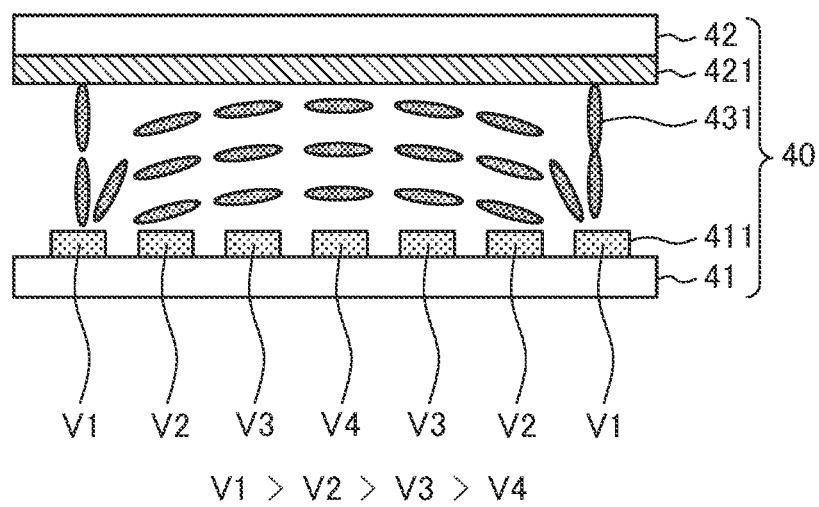
FIG. 25 is a cross sectional view of another structure of the liquid crystal lens.
Figure 26:
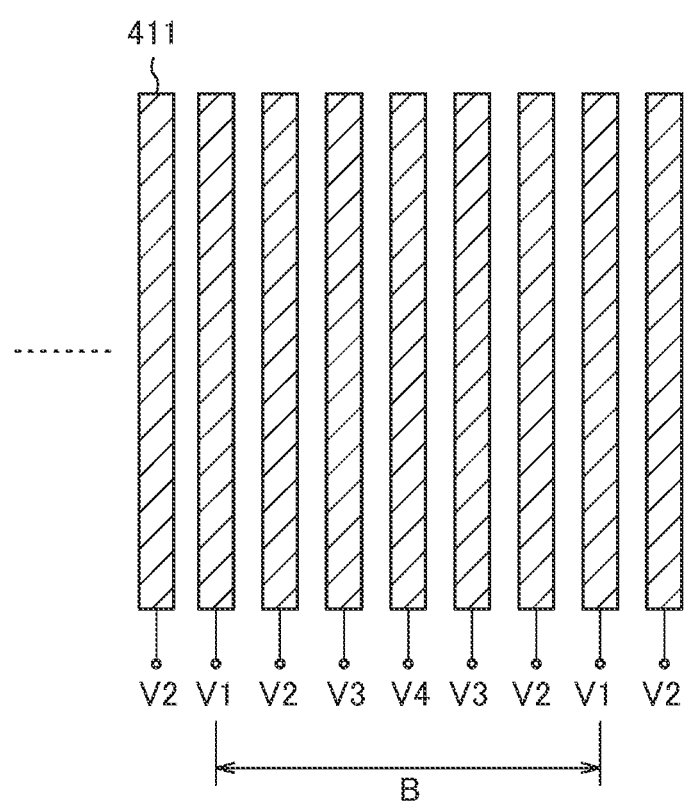
FIG. 26 is a plan view which shows voltages applied to the first electrodes of FIG. 25.

In some cases, a lens having curvature shown FIG. 24 may be used; however, in other cases a lens having curvature of quadratic curve is needed. FIG. 25 is a cross sectional view of the liquid crystal lens, in which the lens shape is made in quadratic curve or in smooth curve without changing a pitch of the lens or a thickness of the liquid crystal layer. In FIG. 25, one lens is formed by seven electrodes 411, and different voltage is applied to each of the electrodes 411 to align the liquid crystal molecules 413 so that refractive index curve becomes a quadratic curve in the liquid crystal lens. In FIG. 25, the voltages are applied as V1>V2>V3>V4. FIG. 26 is a plan view of the comb electrodes 411 corresponding to FIG. 25. The region B in FIG. 26 corresponds to the region B in FIG. 16C.

Figure 27:
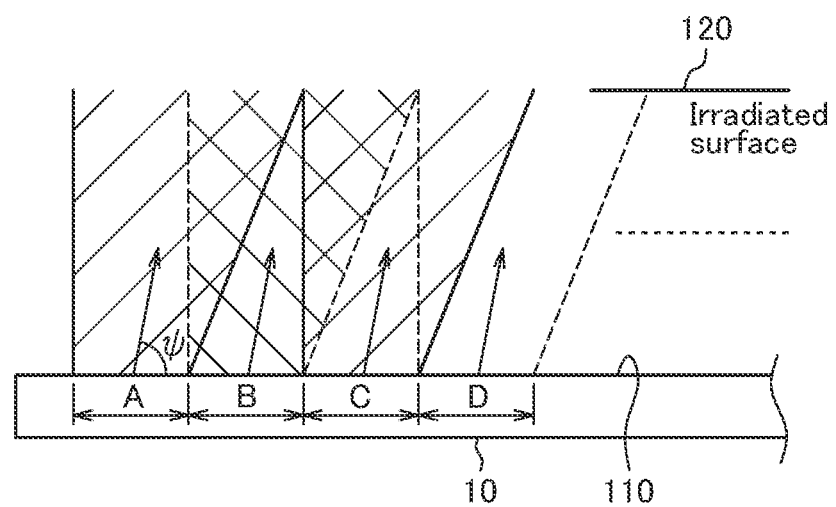
FIG. 27 is a cross sectional view that shows a function of the liquid crystal lens.

In some cases, the direction of the light is intended in a certain direction, not normal to the emitting surface 110. FIG. 27 is an example in which the light from each of the regions A, B, C, and the like is emitted in the direction of φ to the emitting surface 110, not normal to the emitting surface 110. Such function can be attained by shaping each of the liquid crystal lenses asymmetric.

FIG. 28 is a plan view of the comb electrodes 411 in which voltages are applied asymmetrically to each of the comb electrodes 411 to make the asymmetric lens. As shown in FIG. 28, the voltages are applied as V1>V2>V3>V4, and V1>V5≠V3, and V1>V6≠V2. As a result, the liquid crystal molecules 431 are aligned to form an asymmetric lens in the cross sectional view of the liquid crystal lens as shown in FIG. 25.

Figure 29A:
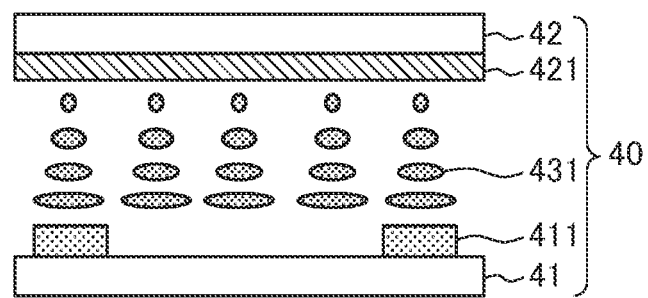
FIG. 29A is a cross sectional view of the lens action of the liquid crystal lens constituted by TN type liquid crystal.
Figure 29B:
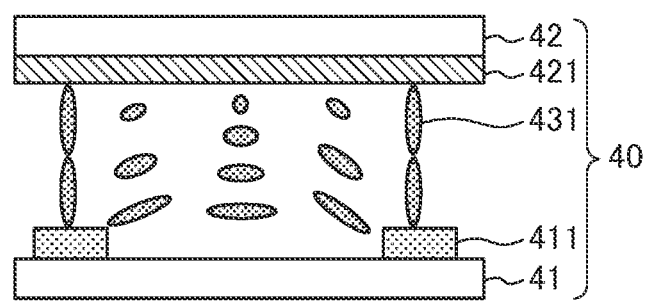
FIG. 29B is another cross sectional view of the lens action of the liquid crystal lens constituted by TN type liquid crystal.

The liquid crystal lens can be realized not only by the homogeneous alignment liquid crystal as shown in FIG. 22A or 25 but also by various other types of liquid crystal devices. FIGS. 29A and 29B are examples in which the liquid crystal lens is formed by TN (Twisted Nematic) type liquid crystal. In the TN type, the liquid crystal molecules 431 rotate their alignment direction in 90 degrees between the first substrate 41 and the second substrate 42.

FIG. 29A is an example in which a voltage is not applied between the first electrode 411 and the second electrode 421. In this case, the liquid crystal molecules 431 are aligned parallel to the first substrate 41 or the second substrate 42; however, alignment direction of the liquid crystal molecules 431 changes 90 degrees between near the first substrate 41 and near the second substrate 42. FIG. 29B is an example in which a voltage is applied between the first electrode 411 and the second electrode 421. In this case, the liquid crystal molecules 431 align in vertical direction to the first substrate 41 at directly above the comb electrode as the first electrode 411, thus, the light is shut. In the intermediate position between the comb electrodes 411, however, the liquid crystal molecules 431 are not influenced by electric field and maintain rotation of 90 degrees with respect to the alignment direction near the first substrate 41; thus, transmittance is not influenced.

When the structure of FIG. 29B is evaluated as a lens, the refractive index is minimum directly above the comb electrode 411 and the refractive index is maximum at the intermediate position between the comb electrodes 411. Therefore, the distributed refractive index type lens GRIN (Gradient Index Lens) is formed. Various shapes of lenses can be realized by configuring the electrodes as in FIG. 25 or FIG. 28 even when the lens is formed by TN type liquid crystal.

Figure 30A:
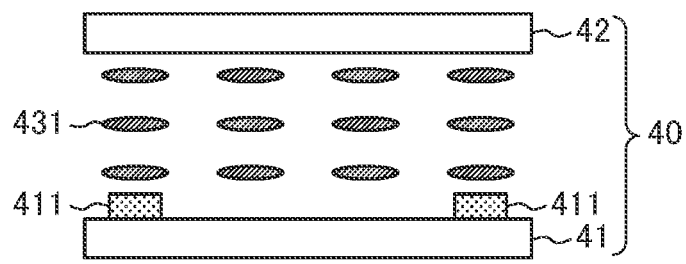
FIG. 30A is a cross sectional view in which a lens action is revealed by applying a voltage between the comb electrodes.
Figure 30B:
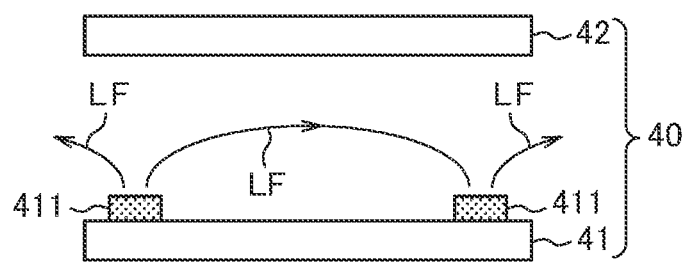
FIG. 30B is another cross sectional view in which a lens action is revealed by applying a voltage between the comb electrodes.
Figure 30C:
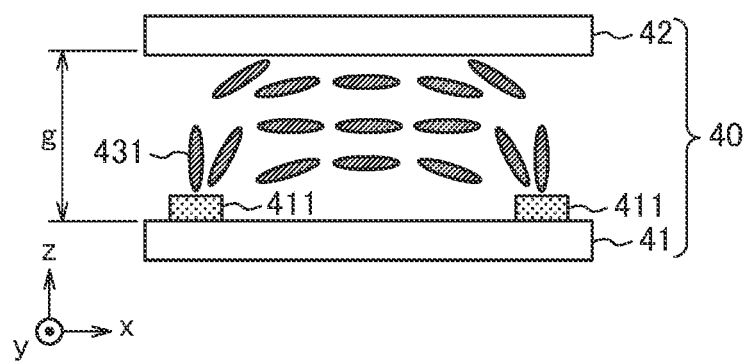
FIG. 30C is yet another cross sectional view in which a lens action is revealed by applying a voltage between the comb electrodes.

FIGS. 30A to 30C are cross sectional views in which the liquid crystal lens is formed by applying a voltage between the first electrodes 411 of comb shape. In FIG. 30A, the comb electrode 411 is formed on the first substrate 41. On the other hand, no electrode is formed on the second substrate 42. The liquid crystal lens is constituted by that the liquid crystal molecules 431 are aligned by applying a voltage between the comb electrodes, thus, the second electrode 421 is not indispensable. The second electrode is formed by a transparent conductive film as ITO (Indium tin Oxide); however, even a transparent conductive film absorbs or reflects light in certain degree, thus, it is profitable from a view of transmittance of the lens if the second electrode 421 does not exist. The second electrode 421 may be formed on the second substrate 42 e.g. if the shape of the lens is intended to be changed.

FIG. 30B shows lines of forces LF generated by applying a voltage between the comb electrodes 411. The lines of forces LF are directed vertically to the substrate 41 at directly above the comb electrode 411; the lines of forces LF are directed in parallel to the substrate 41 at the intermediate position between the comb electrodes 411. The liquid crystal molecules 431 align in the lines of forces LF.

FIG. 30C is a cross sectional view in which the liquid crystal molecules 431 align in the field that is depicted in FIG. 30B. In FIG. 30C, the refractive index is minimum at directly above the comb electrode 411 and is maximum at the intermediate position between the comb electrodes 411. Therefore, in this case too, the distributed refractive index type lens GRIN (Gradient Index Lens) is formed.

Figure 31:
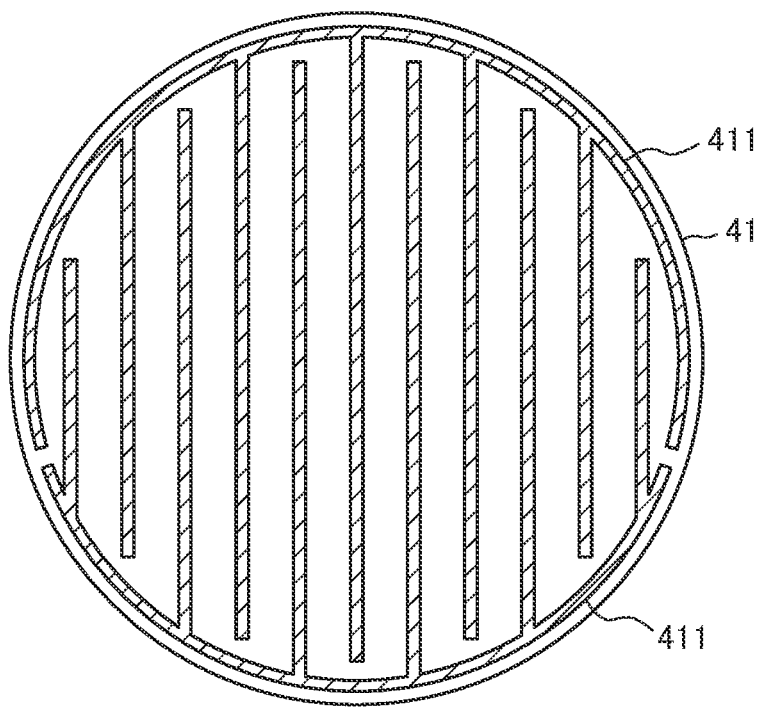
FIG. 31 is a plan view of the first electrode of the liquid crystal lens in which lens action is revealed by applying a voltage between the comb electrodes.

FIG. 31 is a plan view of the first electrode 411 formed on the first substrate 41. In FIG. 31, the first comb electrode 411 and the second comb electrode 411 are nested. The lens depicted in FIG. 30C is formed by applying a voltage between the first comb electrode 411 and the second comb electrode 411. Various liquid crystal lens can be formed by changing a thickness g of the liquid crystal layer, changing a distance s between the comb electrodes 411, and changing a voltage V applied between the comb electrodes 411.

Figure 32:
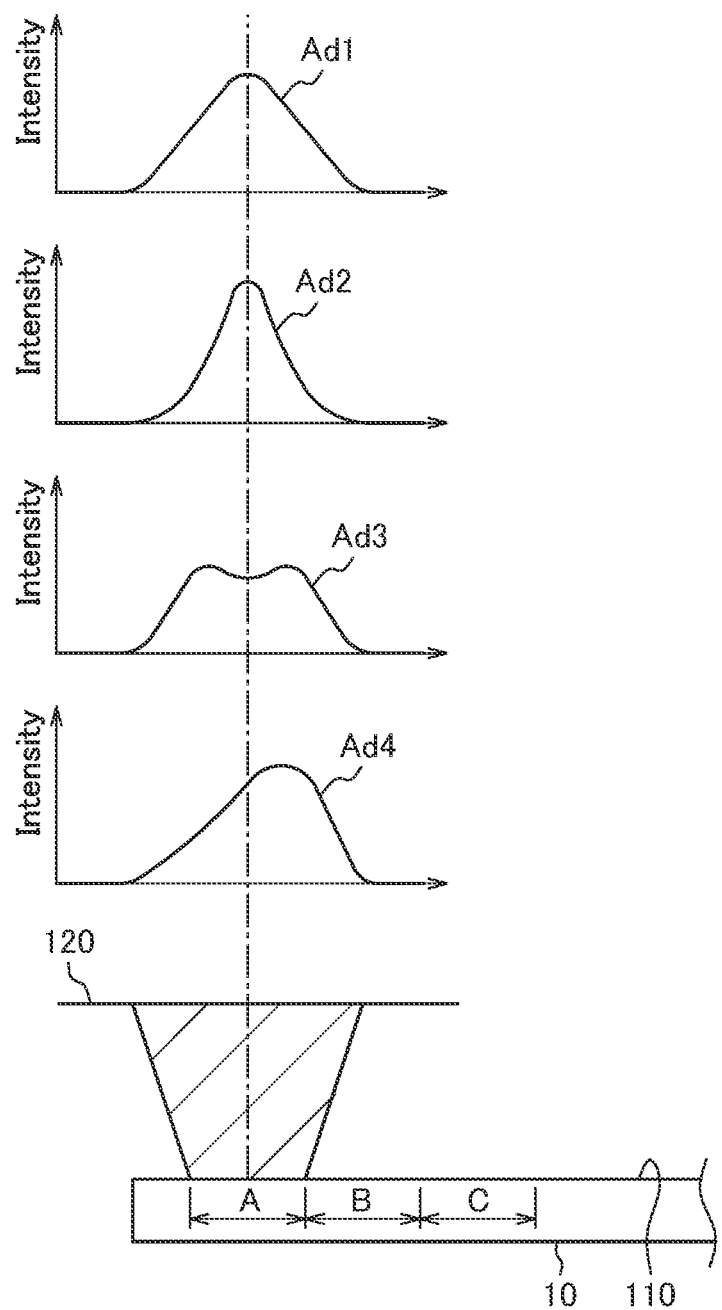
FIG. 32 is a cross sectional view of the illuminance distribution according to the liquid crystal lenses of embodiments 2 and 3.

As described above, lenses of various functions can be formed not only by changing a distance between the electrodes, a thickness of the liquid crystal layer, and an applied voltage between the electrodes, but also by the types of liquid crystal lenses. FIG. 32 shows examples to change the illuminance distribution by the liquid crystal lens. FIG. 32 is the same structure as FIG. 16B and FIG. 16C, however, only emitting light from the region A is shown. FIG. 32 shows that the distribution of the emitting light can be changed in various shapes by the liquid crystal lens set in the region A.

In FIG. 32, the illuminance distribution Ad1 resembles to the normal distribution; the illuminance distribution Ad2 also resembles to the normal distribution, however, the light is more condensed. The illuminance distribution Ad3 shows the liquid crystal lens is used as a divergence lens to acquire a trapezoidal illuminance distribution. The illuminance distribution Ad4 shows a direction of the axis of the illuminance distribution is deviated in polar angle by making the liquid crystal lens asymmetric.

As explained in FIGS. 16A to 16C, the luminance distribution on the screen is a summation of the light emitted from each of the regions of the emitting surface 110. In other words, the illuminance distribution on the irradiating surface 120 can be changed by changing the illuminance distribution from each of the regions, A, B, C, and the like in the emitting surface 110.

Embodiment 3

Figure 33:
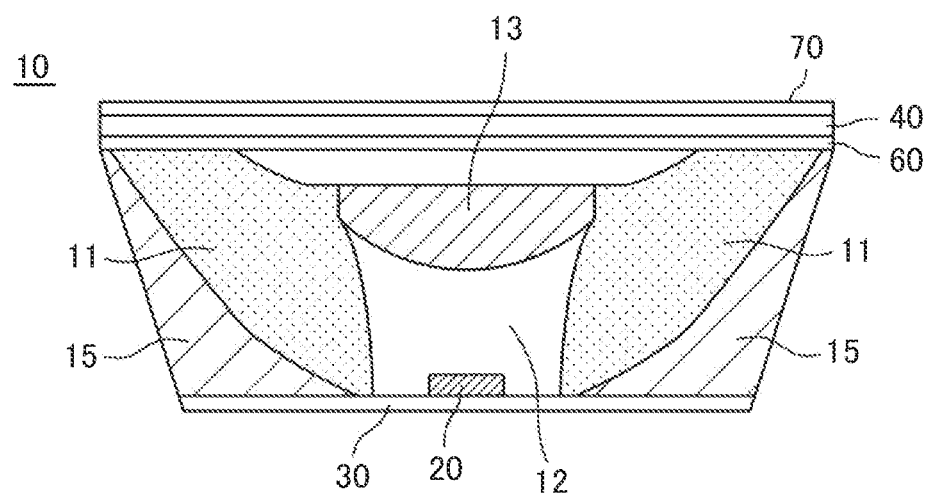
FIG. 33 is a cross sectional view of the lighting device of embodiment 3.

FIG. 33 is a cross sectional view of the lighting device according to embodiment 3. In embodiment 3, the lens action of the liquid crystal lens is in radial direction. In FIG. 33, only one liquid crystal lens 80 is used, other structures are the same as FIG. 12 or 17. The VA (Vertical alignment) type liquid crystal, namely, the homeotropic alignment liquid crystal, is used to form the liquid crystal lens 80 whose lens action is in radial direction. Rubbing process or photo alignment process to align the liquid crystal molecules 431 in a direction parallel to the alignment film is not necessary in the VA type liquid crystal.

Figure 34:
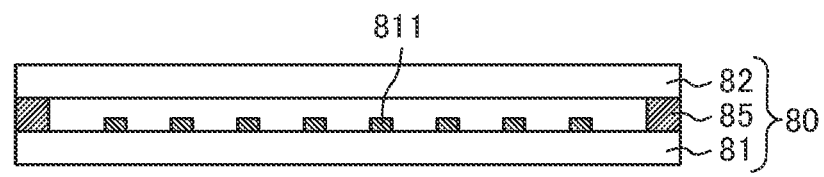
FIG. 34 is a cross sectional view of the liquid crystal lens of FIG. 33.
Figure 35:
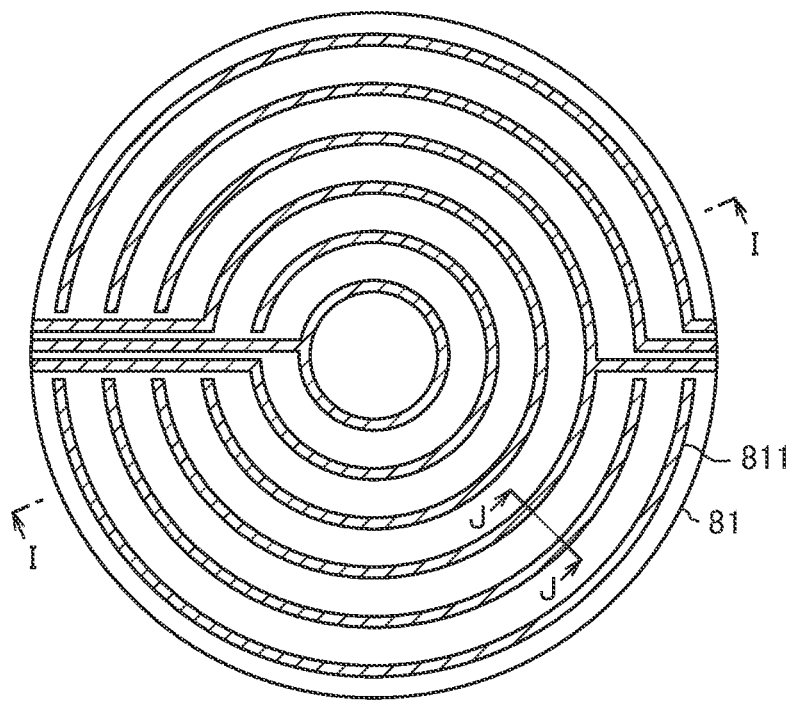
FIG. 35 is a plan view of the first substrate of the liquid crystal lens of FIG. 34.

FIG. 34 is a cross sectional view of the liquid crystal lens 80; FIG. 35 is a plan view of the first electrode 811 formed on the first substrate 81 of the liquid crystal lens 80. FIG. 34 corresponds to the cross section of FIG. 35 along the line I-I. In the liquid crystal lens of FIG. 34, an electrode is not formed on the second substrate 82; the liquid crystal lens is formed by applying voltages between the ring shaped electrodes of the first electrode 811 formed on the first substrate 81.

Figure 36A:
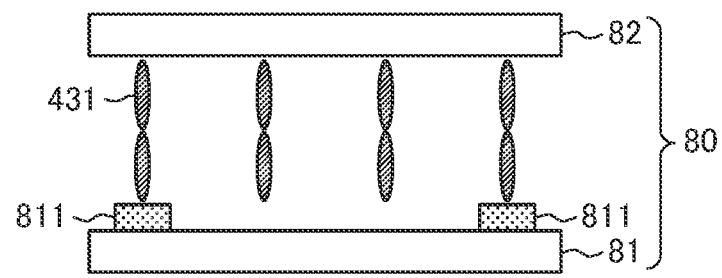
FIG. 36A is a cross sectional view of a lens action of the liquid crystal lens according to FIG. 35 along the line J-J.
Figure 36B:
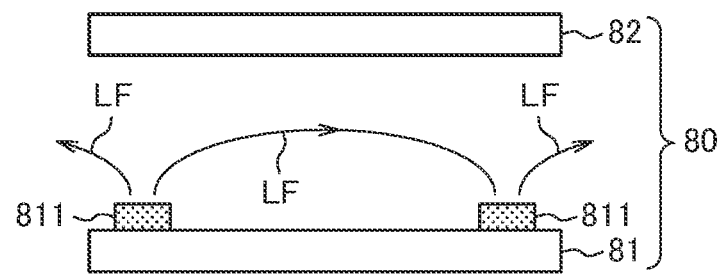
FIG. 36B is another cross sectional view of a lens action of the liquid crystal lens according to FIG. 35 along the line J-J.
Figure 36C:
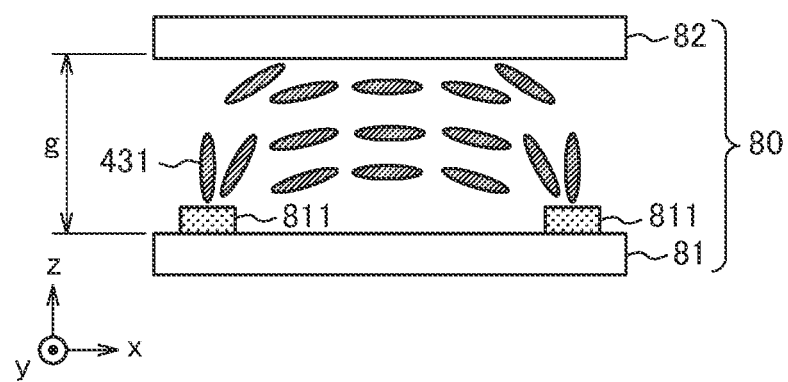
FIG. 36C is yet another cross sectional view of a lens action of the liquid crystal lens according to FIG. 35 along the line J-J.

In FIG. 35, concentrically formed plural ring shaped electrodes constitute the first electrode 811. Each of the ring shaped electrodes 811 can be applied with voltages independently. FIGS. 36A to 36C, which correspond to a cross sectional view of FIG. 35 along the line J-J, explain the lens function of embodiment 3. FIG. 36A is a cross sectional view in which a voltage is not applied to the first electrode 811. Since the liquid crystal is homeotropic in this embodiment, the liquid crystal molecules 431 align vertically to the main planes of the first substrate 81 and the second substrate 82.

FIG. 36B shows lines of forces LF when a voltage is applied between the first electrodes 811. The line of force LF is directed vertically to the substrate 81 at directly above the comb electrode 811, and is directed parallel to the substrate 81 at the intermediate position between the comb electrodes 811. The liquid crystal molecules align along with the line of force.

FIG. 36C is a cross sectional view in which the liquid crystal molecules 431 align with the field of FIG. 36B. In FIG. 36C, the refractive index is minimum at directly above the comb electrode 811 and maximum at the intermediate position between the comb electrodes 811. Therefore, in this case too, the distributed refractive index type lens GRIN (Gradient Index Lens) is formed.

In this case, each of lenses is formed in radial direction of the ring electrodes 811 or in radial direction of the circular first substrate 81 and the circular second substrate 82. However, the function of each of the lenses in the lighting device is the same as explained in FIGS. 16A through 16C and FIG. 32 and so forth.

Embodiment 4

Figure 37:
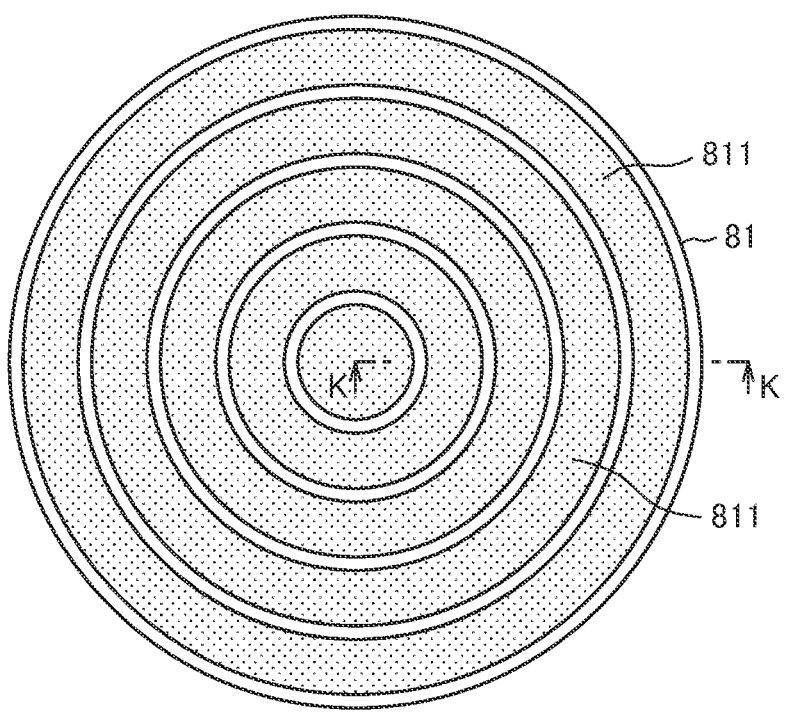
FIG. 37 is a plan view of the first substrate of the liquid crystal lens according to embodiment 4.

This embodiment relates to the structure in which one liquid crystal lens as a whole is formed in circular liquid crystal lens. FIGS. 37 through 40 show an example of this structure. In the meantime, a cross sectional view of the lighting device as a whole of embodiment 4 is the same as FIG. 33. Further, the lower polarizing plate 60 and upper polarizing plate 70 of FIG. 33 and so forth also can be used in embodiment 4. FIG. 37 is an example of the first electrode 811 formed on the circular first electrode 81. Plural ring shaped electrodes formed in concentric constitute the first electrode 811. The width of the ring electrode of FIG. 37 is wider than that of FIG. 35. The leader lines are omitted in FIG. 37.

Figure 38:
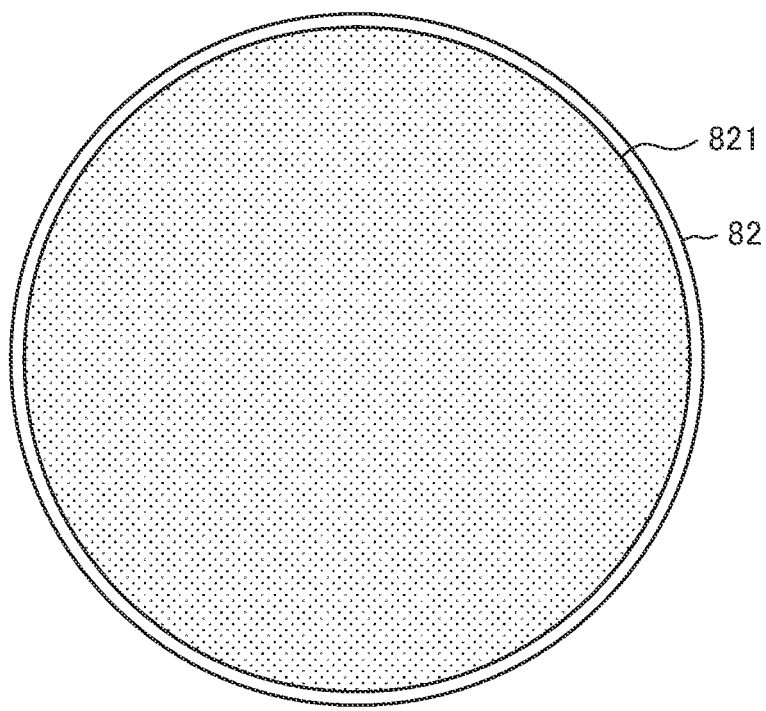
FIG. 38 is a plan view of the second substrate of the liquid crystal lens according to embodiment 4.
Figure 39:
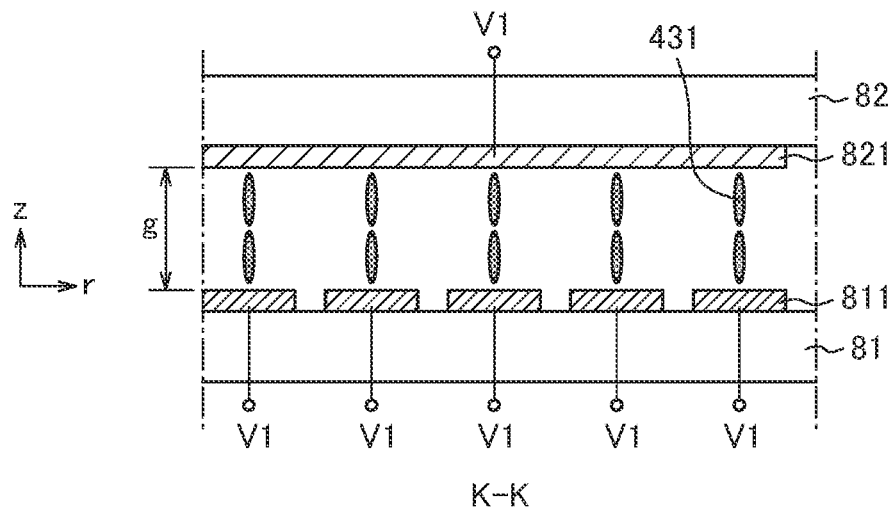
FIG. 39 is a cross sectional view which shows lens action of the liquid crystal lens of embodiment 4.
Figure 40:
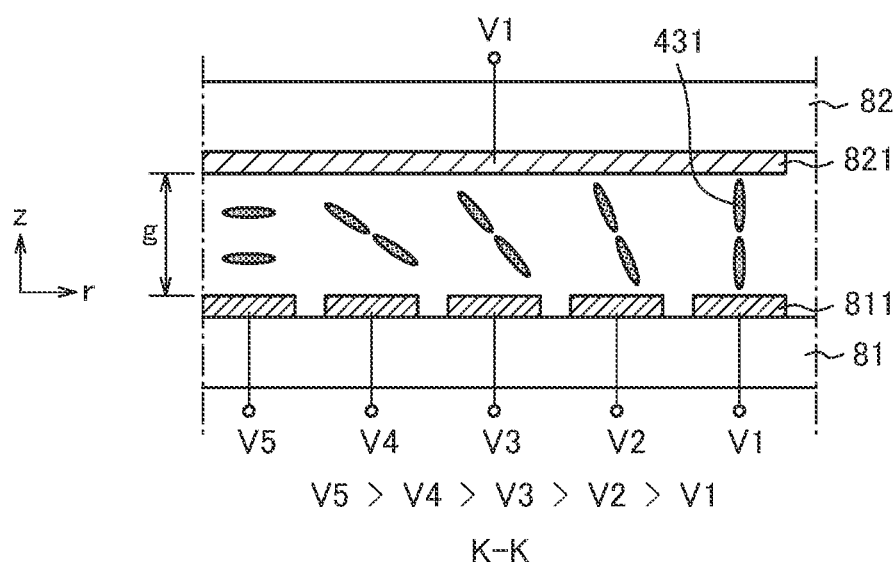
FIG. 40 is another cross sectional view which shows lens action of the liquid crystal lens of embodiment 4.

FIG. 38 is an example of the second electrode 821 formed on the circular second substrate 82. The second electrode 821 is formed in disc shape. The liquid crystal is inserted between the first substrate 81 and the second substrate 82 to constitute the liquid crystal lens. FIGS. 38 and 39 are cross sectional views after the first substrate 81 and the second substrate are assembled; FIGS. 39 and 40 correspond to the cross sectional views of FIG. 37 along the line K-K.

FIG. 39 is a cross sectional view of the liquid crystal lens in which a voltage is not applied between the disc shaped second electrode 821 and the ring shaped first electrodes 811. In FIG. 39, since the liquid crystal is homeotropic type, the liquid crystal molecules 431 align vertically to the major surfaces of the first substrate 81 and the second substrate 82. In FIG. 39, r direction means a radial direction.

FIG. 40 is a cross sectional view in which different voltages are applied to the plural ring shaped first electrodes 811. In FIG. 40, the voltage applied to the second electrode 821 is V1; voltages V1, V2, V3, V4, and V5 are applied to each of the ring shaped first electrodes 821 in order from outside, and V1<V2<V3<V4<V5. The tilting of the liquid crystal molecules 431 becomes larger according to the voltage applied to the first electrode 811 becomes lager; and the liquid crystal molecules 431 align approximately parallel to the first substrate 81 at the center of the first substrate 81.

When FIG. 40 is viewed as a liquid crystal lens, refractive index at the center of the first substrate 81 is maximum where voltage V5 is applied to the first electrode 811 and the liquid crystal molecules 431 align in parallel to the first substrate 81; refractive index at the periphery is minimum where voltage V1 is applied to the first electrode 811 and the liquid crystal molecules align vertically to the first substrate 81. Therefore, from the peripheral portion to the center of the liquid crystal lens, the distributed refractive index type lens GRIN (Gradient Index Lens) is formed. In the liquid crystal lens according to this embodiment, the lens characteristics can be changed according to voltages applied to the plural first electrodes 811, number of the plural electrodes 811, thickness g of the liquid crystal layer and so forth.

What is claimed is:

1. A lighting device comprising:
a resin having lens effect;
a reflection container including a reflecting inner surface;
an LED that is a light source;
wherein
the resin includes an emitting surface, a bottom opposing to the emitting surface, and a hole between the emitting surface and the bottom,
the LED is set in the hole at a side of the bottom,
the resin is contained in the reflection container; and
further comprising:
a first liquid crystal lens disposed on the emitting surface,
a second liquid crystal lens disposed on the first liquid crystal lens,
wherein
the reflecting inner surface of the reflection container is curved in a cross-sectional view, and
an outer surface of the resin that faces the reflection container is curved in a cross-sectional view.

2. The lighting device according to claim 1,
wherein the resin, at a side of the emitting surface, includes a first surface of circular in a plan view, and a second surface at an inner side of the first surface in a plan view,
the second surface is nearer to the bottom than the first surface,
the first surface and the second surface are connected by an inclined third surface.

3. The lighting device according to claim 2,
wherein a side wall of the hole formed in the resin has a curved line in a cross-sectional view.

4. The lighting device according to claim 1,
wherein a thickness of the reflection container is thicker at a side of the bottom than at a side of the emitting surface in a cross-sectional view.

5. The lighting device according to claim 1, further comprising:
a reflection block set in the hole at a side of the emitting surface, and
wherein a surface of the reflection block opposing to the LED is a curved surface.

6. The lighting device according to claim 5,
wherein a surface of the reflection block at the emitting surface side is a flat surface.

7. The lighting device according to claim 6,
wherein an outer shape of the reflection block is circular in a plan view.

\* \* \* \* \*